US012794858B2

(12) United States Patent
Rosenoer

(10) Patent No.: US 12,794,858 B2
(45) **Date of Patent: *Nov. 10, 2026**

(54) SYSTEMS AND METHODS FOR MONITORING DATA NETWORKS FEATURING DATA TRAFFIC WITH USING PROBABILISTIC GRAPHICAL MODELS

(71) Applicant: Citibank, N.A., New York, NY (US)

(72) Inventor: Jonathan Miles Collin Rosenoer, Westport, CT (US)

(73) Assignee: Citibank, N.A., New York, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 19/076,937

(22) Filed: Mar. 11, 2025

(65) Prior Publication Data

US 2025/0211579 A1 Jun. 26, 2025

Related U.S. Application Data

(63) Continuation of application No. 18/920,836, filed on Oct. 18, 2024, now Pat. No. 12,250,201, which is a continuation of application No. 18/639,596, filed on Apr. 18, 2024, now abandoned, which is a continuation-in-part of application No. 18/478,557, filed on Sep. 29, 2023, now abandoned.

(51) Int. Cl.

| | |
|---|---|
| ***H04L 9/40*** | (2022.01) |
| ***G06N 20/00*** | (2019.01) |
| ***G06N 20/10*** | (2019.01) |
| ***G06N 20/20*** | (2019.01) |
| ***H04L 41/16*** | (2022.01) |
| ***H04L 43/045*** | (2022.01) |
| *G06F 18/22* | (2023.01) |

(52) U.S. Cl.
CPC ......... *H04L 63/0407* (2013.01); *G06N 20/00* (2019.01); *G06N 20/10* (2019.01); *G06N 20/20* (2019.01); *H04L 41/16* (2013.01); *G06F 18/22* (2023.01)

(58) Field of Classification Search
CPC ... H04L 63/0407; H04L 41/16; H04L 43/045; G06N 20/00; G06N 20/20; G06N 20/10; G06F 18/22
See application file for complete search history.

(56) References Cited

U.S. PATENT DOCUMENTS

| | | | | |
|---|---|---|---|---|
| 9,678,794 | B1 * | 6/2017 | Barrett | G06F 11/3024 |
| 12,412,118 | B2 * | 9/2025 | Chakraborty | G06N 20/00 |
| 2020/0012902 | A1 * | 1/2020 | Walters | G06F 11/3608 |
| 2021/0049455 | A1 * | 2/2021 | Kursun | G06F 18/213 |
| 2021/0097432 | A1 * | 4/2021 | Olgiati | G06F 17/18 |
| 2021/0141896 | A1 * | 5/2021 | Streit | G06F 18/213 |
| 2022/0198221 | A1 * | 6/2022 | Avegliano | G06F 18/2148 |
| 2022/0215141 | A1 * | 7/2022 | Gutierrez | G06F 17/18 |
| 2022/0215243 | A1 * | 7/2022 | Narayanaswami | G06F 18/2193 |
| 2022/0215262 | A1 * | 7/2022 | Narayanaswami | G06V 10/82 |
| 2023/0010686 | A1 * | 1/2023 | Lesh | G16H 50/70 |

* cited by examiner

*Primary Examiner* — Aftab N. Khan
(74) *Attorney, Agent, or Firm* — Foley & Lardner LLP

(57) ABSTRACT

Systems and methods are for mitigating hindsight bias related to designing and using artificial intelligence models for outlier events. More specifically, systems and methods for the use of synthetic data in the training and/or validation of model predictions in order to prevent overfitting and generate predictions that attempt to predict the unpredictable.

20 Claims, 7 Drawing Sheets

SYSTEMS AND METHODS FOR MONITORING DATA NETWORKS FEATURING DATA TRAFFIC WITH USING PROBABILISTIC GRAPHICAL MODELS

CROSS-REFERENCE TO RELATED APPLICATIONS

This application is a continuation of U.S. patent application Ser. No. 18/920,836, filed Oct. 18, 2024, which is a continuation of U.S. patent application Ser. No. 18/639,596, filed Apr. 18, 2024, which is a continuation-in-part of U.S. patent application Ser. No. 18/478,557, filed Sep. 29, 2023. The content of the foregoing applications is incorporated herein in its entirety by reference.

BACKGROUND

Artificial intelligence, including, but not limited to, machine learning, deep learning, etc. (models of which are referred to collectively herein as "artificial intelligence models," "machine learning models," or simply "models"), has excited the imaginations of both the industry enthusiastic and the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless. Despite this potential, model determinations and predictions suffer problematic hindsight bias related to their design, training processes, and intrinsic limitations.

For example, during training, models learn from historical data based on patterns and statistical relationships within their training data. If the data contains patterns, the model may learn to predict these outcomes in response to detecting a corresponding pattern irrespective of the unpredictability or uncertainty present before the outcome occurred. While such an approach may be acceptable in scenarios that routinely occur, detecting outlier events (e.g., predicting the unpredictable) becomes impossible for the model. That is, the models become susceptible to overfitting. Overfitting is a scenario where a model learns the training data too well, including its noise and random fluctuations. This can lead to the model performing exceptionally well on historical data, because it has essentially 'memorized' the outcomes, but poorly on new, unseen data. As such, the model may appear to understand past events perfectly but fails to generalize this understanding to future or different situations. To further complicate this problem, when these models are applied to real-world scenarios, their predictions or interpretations might not account for the complexity or the unforeseen factors influencing outcomes (e.g., the unpredictability or uncertainty present before each outcome).

SUMMARY

Systems and methods are described herein for novel uses and/or improvements to artificial intelligence applications. As one example, systems and methods are described herein for mitigating hindsight bias related to designing and using artificial intelligence models for outlier events. More specifically, systems and methods are described for the use of synthetic data in the training and/or validation of model predictions in order to prevent overfitting and generate predictions that attempt to predict the unpredictable despite the aforementioned technical problems.

To achieve this technical benefit, the system may determine unique or unpredictable characteristics in current training data and generate synthetic data to represent events corresponding to the unique or unpredictable event. For example, the system may retrieve a first dataset for a first predictive model. As one example, in a dataset of air traffic control data used to predict the timeliness of arrivals and departure of airplanes, where the input to the predictive model is an expected departure time and an expected arrival time of inflight aircraft, the output may be a variance from those expectations. While the model may be trained to generate those outputs, the predictive model may be ill-suited for detecting other unpredictable and/or outlier events such as an airline crash after takeoff. Accordingly, the system may generate synthetic data upon which a new predictive model may be trained to detect the outlier events.

To generate the synthetic data, the system may identify a characteristic in the output corresponding to the unpredictable and/or outlier event (e.g., a variance in expected arrival time of an inflight airline going to infinity in the case of an airline crash simulation). The system may then generate synthetic data that, when processed by the model, results in at least some outputs having that characteristic (e.g., resulting in an output going to infinity). With respect to the air traffic example above, the system may generate a synthetic dataset of air traffic control data that when processed by the predictive model results in an at least some outputs having a variance in expected arrival time of an inflight airline going to infinity.

However, generating synthetic data that, when processed by the predictive model, results in at least some outputs having that characteristic also raises a novel technical issue particular to model training and development. Specifically, while the predictive model will no longer be overfit on the routine data (and thus exclude potential outliers), the predictive model may nonetheless now be overfit to predict the outlier. As such, the system may impose an additional model constraint (e.g., a hyperparameter guardrail) that limits the number of outputs having that characteristic. This model constraint is applied to a synthetic data generator model (e.g., a model used to generate synthetic data) during the training of the synthetic data generator model. Moreover, this model constraint is applied as a training parameter such that the synthetic data generator model is trained to generate training synthetic data that when the first model processes the synthetic data, the first model predicts the threshold number of outputs having the target characteristic. By doing so, the synthetic data generator model may generate synthetic data upon which a new predictive model may be based. The new predictive model will also not be overfit to either the routine cases nor the outliers. With respect to the air traffic example above, the system may select a model constraint corresponding to an actual number of airline crashes over a period of time). The system may then iteratively train the synthetic data generator model to generate air traffic control data that when processed by the predictive model results in the threshold number of outputs having a characteristic (e.g., an arrival time going to infinity). The system may then train a new predictive model based on the synthetic air traffic control data.

In some aspects, the systems and methods for mitigating hindsight bias related to training and using artificial intelligence models for outlier events by applying model constraints to synthetic data generator models are described. For example, the system may receive a first dataset, wherein the first dataset comprises actual historical data over a first time period. The system may receive a first predictive model that generates first outputs, wherein the first predictive model is trained on the first dataset, wherein the first outputs have a first plurality of characteristics. The system may receive a first characteristic requirement for the first outputs, wherein the first characteristic requirement comprises a required threshold for a first characteristic in the first plurality of characteristics. The system may generate first synthetic data using a synthetic data generator model, wherein the first synthetic data comprises synthetic historical data over the first time period, wherein the synthetic data generator model is trained to generate the first synthetic data, and wherein training the synthetic data generator model comprises applying a model constraint to the synthetic data generator model during training, wherein the model constraint is based on the first characteristic requirement being met in second outputs of the first predictive model when the first synthetic data is processed by the first predictive model. The system may train a second predictive model based on the first synthetic data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
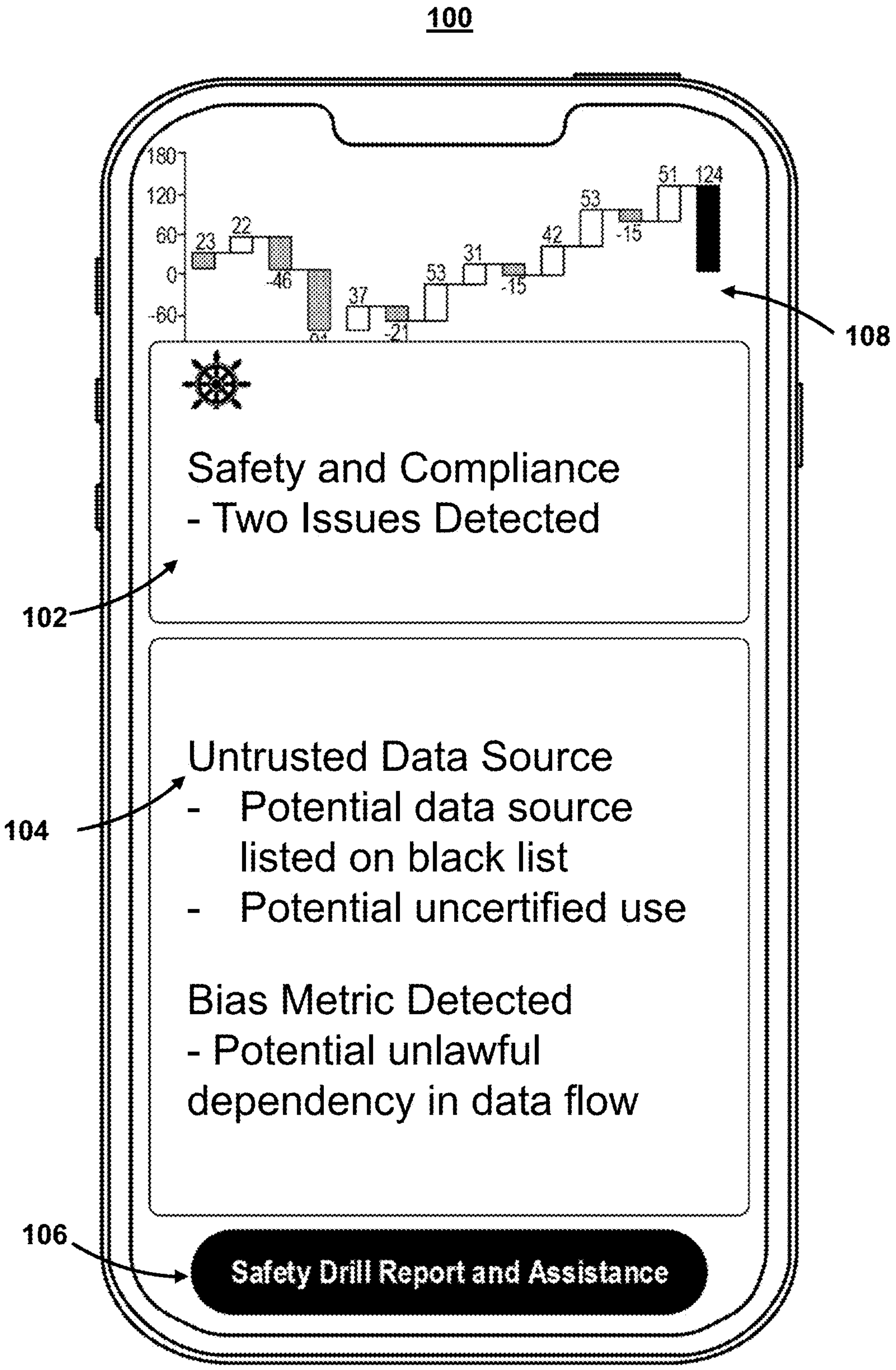
FIG. 1A shows an illustrative diagram for monitoring compliance of artificial intelligence models using an observer model, in accordance with one or more embodiments.

FIG. 1A shows an illustrative diagram for monitoring compliance of artificial intelligence models using an observer model, in accordance with one or more embodiments. For example, as described herein, an observer model may refer to a separate or secondary model that is designed to monitor and analyze the behavior of a primary model. The purpose of an observer model is to provide insights, detect anomalies, or assess the performance and reliability of the primary model. The observer model may be used in scenarios where transparency, interpretability, or trustworthiness of artificial intelligence systems is a concern. Artificial intelligence, including, but not limited to, machine learning, deep learning, etc. (models of which are referred to collectively herein as "artificial intelligence models," "machine learning models," or simply "models"), has excited the imaginations of both the industry enthusiastic and the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. For example, many models, especially deep learning models, have complex architectures with numerous layers, parameters, and/or high-dimensionality. This complexity makes it difficult to understand how the model processes and transforms input data. To further complicate this issue, many models rely on non-linear functions, which means that small changes in input data can lead to significant changes in output predictions. This makes it challenging to predict how the model will behave in different scenarios. Finally, some models, such as deep neural networks, are often described as opaque "black boxes" because it would be extremely challenging for humans to interpret and understand how the model reasons and arrives at its decisions. In such models, the system may learn patterns and features from data, but it may not be clear which specific features are driving the predictions. This becomes more problematic as artificial intelligence gets more advanced. These technical problems present an inherent problem with attempting to use an artificial intelligence-based solution in applications in which the processes and decisions used to generate a recommendation must themselves conform to rules, regulations, and/or other requirements that they perform safely and predictably prior to, and during, real-world deployment. Providing comprehensive explainability at the human level can drive trade-offs with performance that potentially slow down or reduce AI system capabilities.

The observer model can continuously monitor the performance of the primary artificial intelligence model during deployment. It can track metrics such as accuracy, precision, recall, or F1 score to ensure that the model is meeting its performance objectives. Additionally or alternatively, the observer model can be trained to identify anomalous behavior in the primary model's predictions. This can include detecting outliers, unexpected patterns, or deviations from expected behavior. Additionally or alternatively, in cases where the primary model is a complex, black-box model, the observer model can be used to provide explanations for the primary model's decisions. The observer model can analyze the primary model's internal representations and generate human-interpretable explanations.

Additionally or alternatively, the observer model can assess the fairness and potential bias in the decisions made by the primary model. It can identify cases where the primary model's predictions may be unfairly biased against certain groups. Additionally or alternatively, the observer model can test the robustness of the primary model by subjecting it to adversarial attacks or variations in input data. The observer model can assess how well the primary model performs under different conditions. Additionally or alternatively, the observer model can detect concept drift or data distribution changes that may affect the performance of the primary model over time. When drift is detected, corrective actions can be taken. Additionally or alternatively, the observer model can, in security-sensitive applications, monitor the primary model for signs of malicious or adversarial behavior. The observer model can help detect and mitigate security threats.

Additionally or alternatively, the observer model can be part of a feedback loop that provides information for model retraining or fine-tuning. When the observer detects issues, this feedback can be used to improve the primary model. Additionally or alternatively, the observer model can generate real-time alerts or notifications when it detects significant deviations or issues with the primary artificial intelligence model. This enables timely intervention and maintenance. Additionally or alternatively, the observer model can assess the quality of the data being fed into the primary model. The observer model can identify data anomalies, missing values, or inconsistencies that may affect the primary model's performance. Additionally or alternatively, the observer model can, in regulated industries, assist in demonstrating compliance with legal and ethical standards. The observer model can provide an additional layer of accountability for the primary model.

FIG. 1A shows user interface 100. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may comprise content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on active or passive monitoring by the system.

As shown in FIG. 1A, the system may process data of a first model to generate a result 108. In some embodiments, the data may comprise time-series data. As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., price) of an asset (e.g., security) over time. This tracking can occur over the short term, such as the price of a security on the hour over the course of a business day, or the long term, such as the price of a security at close on the last day of every month over the course of five years. The system may generate a time-series analysis. For example, a time-series analysis may be useful to see how a given asset, security, or economic variable changes over time. It can also be used to examine how the changes associated with the chosen data point compare to shifts in other variables over the same time period. For example, with regard to retail loss, the system may receive time-series data for the various sub-segments indicating daily values for theft, product returns, etc.

The system may receive, via a user interface, a first user request to perform a compliance test on a first model. As described herein, a compliance test may comprise a test on a model that is designed to evaluate whether the model and its associated processes adhere to a set of predefined compliance requirements, standards, and/or regulations. These tests are performed to ensure that the model meets ethical, legal, security, privacy, fairness, and/or other criteria that are relevant to its intended use. Compliance tests are essential for assessing whether a model is developed and deployed in a responsible and accountable manner.

The system may also receive, via the user interface, a compliance requirement, wherein the compliance requirement comprises a requirement for a threshold level of data security when processing user data through the first model. As referred to herein, a compliance requirement for models may refer to the set of rules, regulations, and/or standards that must be followed when developing, deploying, and using artificial intelligence systems. These requirements may be established to ensure that systems are ethical, fair, secure, and/or transparent. Compliance requirements can vary depending on the industry, application, and/or jurisdiction.

In some embodiments, the compliance requirements may relate to data privacy and security. For example, compliance with data privacy laws such as the General Data Protection Regulation (GDPR) in Europe or the Health Insurance Portability and Accountability Act (HIPAA) in the United States may require models to handle personal and sensitive data in a secure and privacy-preserving manner.

In some embodiments, the compliance requirements may relate to fairness and bias mitigation. For example, to prevent discrimination and bias in models, compliance may require thorough fairness assessments and mitigation strategies. This may involve ensuring that the model's predictions are fair and equitable across different demographic groups.

In some embodiments, the compliance requirements may relate to transparency and explainability. For example, some regulations mandate that artificial intelligence models provide explanations for their decisions, especially in critical domains like finance, healthcare, and legal. Compliance may involve using explainable artificial intelligence (XAI) techniques to make artificial intelligence models more transparent.

In some embodiments, the compliance requirements may relate to algorithmic accountability. For example, organizations may be required to establish accountability mechanisms for models, including documenting the development process, tracking model performance, and having procedures in place for addressing errors and biases.

In some embodiments, the compliance requirements may relate to accuracy and reliability. For example, models may be required to meet certain accuracy and reliability standards, especially in safety-critical applications. Compliance may involve rigorous testing, validation, and monitoring of model performance.

In some embodiments, the compliance requirements may relate to model versioning and auditing. For example, keeping track of model versions and maintaining an audit trail of model changes and updates may be required to ensure transparency and accountability. In some embodiments, the compliance requirements may relate to ethical considerations. For example, organizations may need to adhere to ethical guidelines and principles when developing and using models. This can include considerations related to the impact of the models on society, environment, and human rights.

In some embodiments, the compliance requirements may relate to legal and regulatory compliance. For example, compliance with industry-specific regulations, such as those in healthcare (e.g., regulations of the U.S. Food and Drug Administration) or finance (e.g., regulations of the U.S. Securities and Exchange Commission), may be required to avoid legal and financial consequences. In some embodiments, the compliance requirements may relate to data governance. For example, the system may ensure the quality, integrity, and legality of the data used to train models as a compliance requirement. This involves data governance practices and data management procedures.

In some embodiments, the compliance requirements may relate to user consent and transparency. In some cases, compliance may require obtaining informed consent from users before collecting and processing their data. Transparency about data usage and artificial intelligence system capabilities is also essential. In some embodiments, the compliance requirements may relate to security. For example, models may be required to be developed and deployed with strong cybersecurity measures to prevent unauthorized access, tampering, or exploitation.

In some embodiments, the compliance requirements may relate to documentation and reporting. For example, organizations may be required to maintain detailed documentation of model development and deployment processes and report on model-related activities to regulatory authorities.

The system may generate for display, on user interface 100, a recommendation based on comparing the first probability to the threshold probability. For example, the system may generate recommendation 102. Recommendation 102 may indicate potential issues related to one or more compliance requirements. The system may also allow a user to view additional information (e.g., information 104) related to the detected issue as well as perform additional functions (e.g., functions 106).

For example, the system may use an observer model that comprises a probabilistic graphical model that indicates a probability that a given node, edge, and/or weight attributed thereto is used to determine results in the given model. The probabilistic graphical model may be model-specific (e.g., trained specifically on the first model) as opposed to feature-specific, meaning that the results from the probabilistic graphical model indicate probabilities that the given model has certain graphical characteristics (e.g., certain characteristics related to node, edge, and/or weight attributed thereto). As the given model is not feature-specific (i.e., does not rely on permutation involving a given feature to determine importance values of the given feature in generating a specific result), the probabilistic graphical model is not limited to ad hoc analyses. Instead, the probabilistic graphical model may generate one or more results that indicate a probability that the given model comprises one or more graphical characteristics. Since these graphical characteristics remain the same as various results are determined (e.g., different inputs may generate different outputs across the given model), the probabilistic graphical model does not affect, or depend on, the given model's run-time, allowing the given model to remain in use and/or continuously generate results.

The results of the probabilistic graphical model (e.g., probabilities that the given model has certain graphical characteristics) and/or any issues detected may be used to update and/or retrain the first model. That is, the system may determine the graphical characteristics using training data for a given model that may comprise known relationships, architecture attributes, and, in some cases, aggregations of information based on individual permutation-based and feature-specific results. By doing so, the probabilistic graphical model may determine whether a given model corresponds to a required graphical characteristic (or rule, regulation, and/or other requirement corresponding to the required graphical characteristic) as well as recommend adjustments to the given model to improve the probability that the given model has the required graphical characteristic.

Figure 1B:
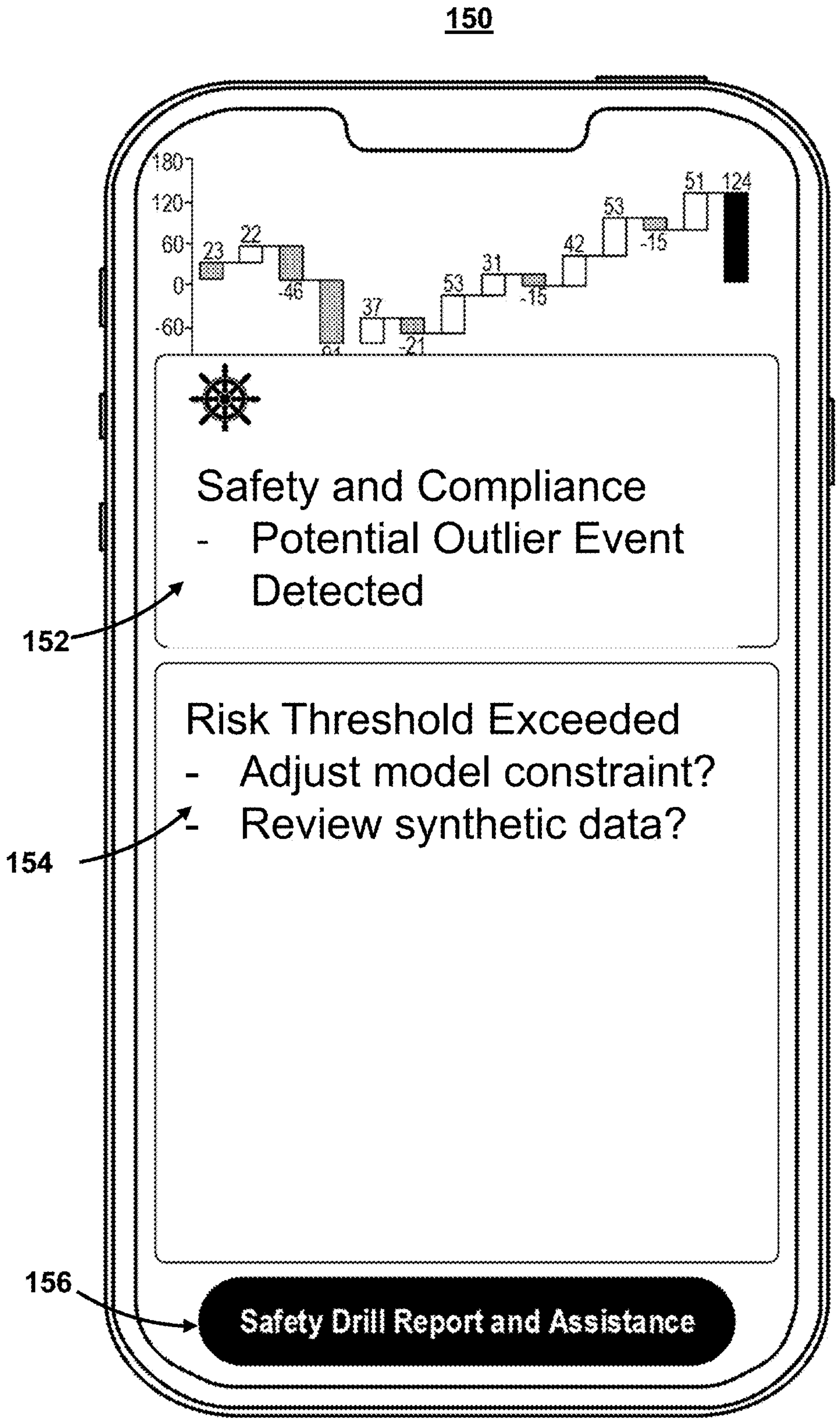
FIG. 1B shows an illustrative diagram for detecting outlier events, in accordance with one or more embodiments.

FIG. 1B shows an illustrative diagram for detecting outlier events, in accordance with one or more embodiments. For example, the system may generate for display, on user interface 150, a recommendation based on a predictive model trained on synthetic data. For example, the system may generate recommendation 152. Recommendation 152 may indicate potential issues related to one or more outlier events. The system may also allow a user to view additional information (e.g., information 154) related to the detected outlier event as well as perform additional functions (e.g., functions 156). To generate recommendation 152, the system may use a predictive model that is trained on synthetic data. As stated above, the system may determine unique or unpredictable characteristics in current training data and generate synthetic data to represent events corresponding to the unique or unpredictable event. For example, the system may retrieve a first dataset for a first predictive model. As one example, in a dataset of accident reports used to predict the return rate of a given product. While the model may be trained to generate those outputs, the predictive model may be ill-suited for detecting other unpredictable and/or outlier events such as product failures. Accordingly, the system may generate synthetic data upon which a new predictive model may be trained to detect the outlier events.

As described herein, an outlier may refer to a data point that significantly differs from other observations. It stands out due to its distinct characteristics when compared to the majority of data points. Outliers can be the result of variability in the measurement or experimental errors; however, they might also indicate a novel or significant finding that deviates from the norm. In statistical terms, outliers can skew the results of the data analysis, affecting the mean, standard deviation, and the overall interpretation of the data. Identifying and understanding the nature of outliers is crucial because their presence can signal that something is significantly different-either due to error or a unique phenomenon worth exploring further. There are various methods to detect outliers, including statistical tests, visualization tools like box plots, and more sophisticated analytical techniques such as Z-scores, IQR (Interquartile Range) methods, or using machine learning algorithms designed to identify anomalies within data.

For example, the system may receive a first dataset, wherein the first dataset comprises actual historical data over a first time period. In some embodiments, the system may determine where the historical data can be sourced from (e.g., public datasets, proprietary databases, online repositories, archives, etc.). The system may collect the data from these sources, which may involve web scraping, API calls, downloading datasets, or manually compiling data. The system may clean the data as historical data often comes with errors, missing values, and/or inconsistencies. Cleaning data may involve the system removing or correcting these issues to improve data quality. The system may also preprocess the data, which may include normalizing data formats, converting data types, and/or handling missing values. For time-series data, the system may also involve aligning timestamps and ensuring the data is in the correct chronological order. The system may organize the data into a structured format that is suitable for the AI model. This may involve the system tabulating data into rows and columns, creating structured files like CSVs or JSONs, or even formatting the data into tensors for deep learning models.

The system may then train a first predictive model to generate first outputs based on the first dataset, wherein the first outputs have a first plurality of characteristics. As described herein, output characteristics (or simply characteristics) may include various attributes, depending on the type of model, the nature of the task being performed, and the domain in which it is applied. A predictive model may be a statistical or artificial intelligence tool that, based on historical data, is designed to predict future outcomes or behaviors. It operates by identifying patterns, correlations, and/or relationships between different variables within a dataset and uses this information to forecast unseen or future data points. The essence of a predictive model lies in its ability to take input data, process it through a mathematical or computational framework developed during its training phase, and produce a prediction about a future event or state.

For example, the characteristic may comprise a type of output such as whether the data is continuous data, categorical data, sequences, and/or structured data. For regression models, the output is continuous, representing a quantity that can have any value within a range. Examples include predicting house prices or stock values. Classification models output categorical data, which represent discrete classes or labels. For example, identifying an image as a cat or a dog. Sequence models, like those used in natural language processing, generate sequences of data, such as text or time series predictions. Outputs can also be structured data, such as tables or JSON objects, especially in models designed for data extraction from texts or images.

For example, the characteristic may comprise confidence (or certainty) levels. For example, many models, especially classifiers, provide a probability score along with predictions, indicating the model's confidence in its output. These scores can be critical for decision-making processes. In another example, the characteristic may comprise a variability and/or uncertainty. Some models produce consistent outputs for the same input, while others, especially those incorporating randomness (like some deep learning models), may produce slightly different outputs on different runs. Advanced models can quantify the uncertainty of their predictions, which is particularly useful in fields like medical diagnosis or autonomous driving, where decisions are made under uncertainty.

In some embodiments, the characteristic may comprise a resolution or detail. The detail or granularity of the output can vary widely. For instance, image generation models can produce high-resolution images, while summary models output condensed information from large texts. The precision of the output, or how finely tuned the predictions are, can differ based on the model's architecture and training.

In some embodiments, the characteristic may relate to interpretability. Some models provide outputs along with explanations or feature importances, making it easier to interpret why the model made a certain prediction. This is crucial for transparency and trust in AI applications. The complexity of the output can range from simple, straightforward answers to complex, nuanced responses that require domain expertise to interpret.

In some embodiments, the characteristic may relate to a time frame, time indicator, time stamp, and/or other temporally related data (e.g., whether the output is real-time or delayed). For example, some models, especially in streaming applications, produce real-time outputs, while others may output predictions with some delay due to processing time. In some embodiments, the format of the output can be text (e.g., translations), images (e.g., generated artworks), audio (e.g., synthesized speech), or video (e.g., animated sequences), among others. For example, some models may produce multimodal outputs that combine several types of data, such as a report that includes text, charts, and images.

The system may also receive (e.g., via user interface) a first characteristic requirement for the first outputs, wherein the first characteristic requirement comprises a required threshold for a first characteristic in the first plurality of characteristics. As described herein, the first characteristic requirement may comprise a requirement related to one or more characteristics. For example, the characteristic requirement may establish a threshold (e.g., a minimum or maximum value of), a value range, a binary determination (e.g., present or not), and/or other value required for one or more characteristics.

The system may train a synthetic data generator model to generate first synthetic data, wherein the first synthetic data comprises synthetic historical data over the first time period, and wherein training the synthetic data generator model comprises applying a model constraint to the synthetic data generator model during training, wherein the model constraint is based on the first characteristic requirement being met in second outputs of the first predictive model when the first synthetic data is processed by the first predictive model. For example, training a synthetic data generator model to produce synthetic historical data that meets specific characteristic requirements may involve a nuanced and iterative process. This process ensures that the generated data not only mimics the statistical properties of real historical data but also aligns with constraints or requirements essential for subsequent analysis or prediction tasks.

For example, the system may receive a first characteristic requirement that the synthetic data must meet. For example, this could involve the data meeting certain statistical properties, patterns, or behaviors that should be present in the synthetic data to make it useful for specific types of analysis or prediction. The system may also determine a model constraint. The system may determine the constraints based on the characteristic requirements. These constraints guide the synthetic data generator model to produce data that, when used by the predictive model, results in outputs meeting these predefined requirements.

The system may start by training the synthetic data generator model on real historical data. This phase does not yet apply the model constraint. The goal here is to have the model learn the underlying distribution and temporal dynamics of the historical data. Once the synthetic data generator has a basic understanding of the data, the system may integrate it with the predictive model. This involves generating synthetic data, feeding it into the predictive model, and evaluating the predictive model's outputs against the first characteristic requirement. The system may then adjust the training process of the synthetic data generator to incorporate feedback from the predictive model's performance. The system may apply the model constraint during training to ensure that the synthetic data, when processed by the predictive model, results in outputs that meet the characteristic requirements.

The system may then, in response to determining that the first synthetic data meets the model constraint, validate the first synthetic data. The system may perform this by inputting first synthetic data into the first predictive model to generate the second outputs, wherein the second outputs have a second plurality of characteristics. The system may then determine to validate the first synthetic data by determining that the first characteristic in the second plurality of characteristics meets the first characteristic requirement. For example, the system may establish an iterative feedback loop where the synthetic data generator model is continuously adjusted based on how well the synthetic data meets the characteristic requirements when processed by the predictive model. This can be achieved through techniques such as reinforcement learning, where the generator is rewarded for producing data that leads to the desired outputs. The system may then refine the model constraint as necessary based on the performance of the predictive model and the evolving understanding of what characteristics of synthetic data lead to the best outcomes.

In some embodiments, the synthetic data generator model may be a generative model that may use Retrieval-Augmented Generation (RAG). For example, the generative model may be trained or adapted from existing models to produce synthetic data. This model is designed to generate new data points by learning the underlying patterns and distributions of the dataset. When generating a new piece of synthetic data, the system first formulates a query based on the desired characteristics of the output. This query could be explicitly defined by a user or automatically generated based on a set of predefined criteria. The system uses the query to retrieve relevant data points or information snippets from the repository. The retrieval process is crucial as it determines the context and factual basis that the generative model will use to produce the synthetic data. The retrieved data is integrated into the generative model's input, providing a rich context and factual foundation for the generation process. This integration allows the generative model to leverage specific details from the retrieved data, ensuring that the synthetic data is realistic and relevant. The generative model then produces a new data point, extrapolating from the provided context and its learned knowledge of the data distribution. This step might involve generating text, images, numerical data, or any other form of data depending on the model's capabilities and the task at hand.

In some embodiments, the synthetic data generator model may use Generative Knowledge Prompting (GKP). GKP leverages large pre-trained generative models to produce synthetic data by prompting these models with carefully crafted inputs that encapsulate specific knowledge requirements or context. GKP essentially combines the art of prompting—formulating inputs that guide the model towards desired outputs—with the generative model's inherent ability to synthesize data based on its training. For example, the system may develop prompts that guide the generative model to produce outputs that meet specific criteria (e.g., related to a specific outlier event). This involves specifying the context (e.g., via an automatic determination and/or a manual user input), the format of the desired data, and any constraints or characteristics that the synthetic data should adhere to. The system may refine the prompts to improve the quality and relevance of the generated data. This may involve adjusting the specificity, the style, or the structure of the prompts based on the outputs received. The system may then feed the engineered prompts into the generative model. The model uses the information provided in the prompts to generate synthetic data that aligns with the given instructions. To produce large datasets, the system can automate the process, generating multiple data points in batches by varying the prompts or using parameterized prompts that can be programmatically adjusted. The system may then assess the quality of the generated synthetic data against predefined criteria. This evaluation might consider factors like realism, diversity, accuracy (if replicating known patterns or data distributions), and adherence to specified constraints.

In response to validating the first synthetic data, the system may train a second predictive model based on the first synthetic data. For example, the system may establish an iterative feedback loop where the synthetic data generator model is continuously adjusted based on how well the synthetic data meets the characteristic requirements when processed by the predictive model. This can be achieved through techniques such as reinforcement learning, where the generator is rewarded for producing data that leads to the desired outputs. The system may then refine the model constraint as necessary based on the performance of the predictive model and the evolving understanding of what characteristics of synthetic data lead to the best outcomes.

Once the second predictive model is trained the system may receive inputted data to generate predictions that may include potential outlier events. For example, the system may receive a first feature input for the second predictive model. The system may then process the first feature input using the second predictive model to generate a first output. The system may then generate for display, on a user interface (e.g., user interface 150), a first recommendation based on the first output.

Figure 2:
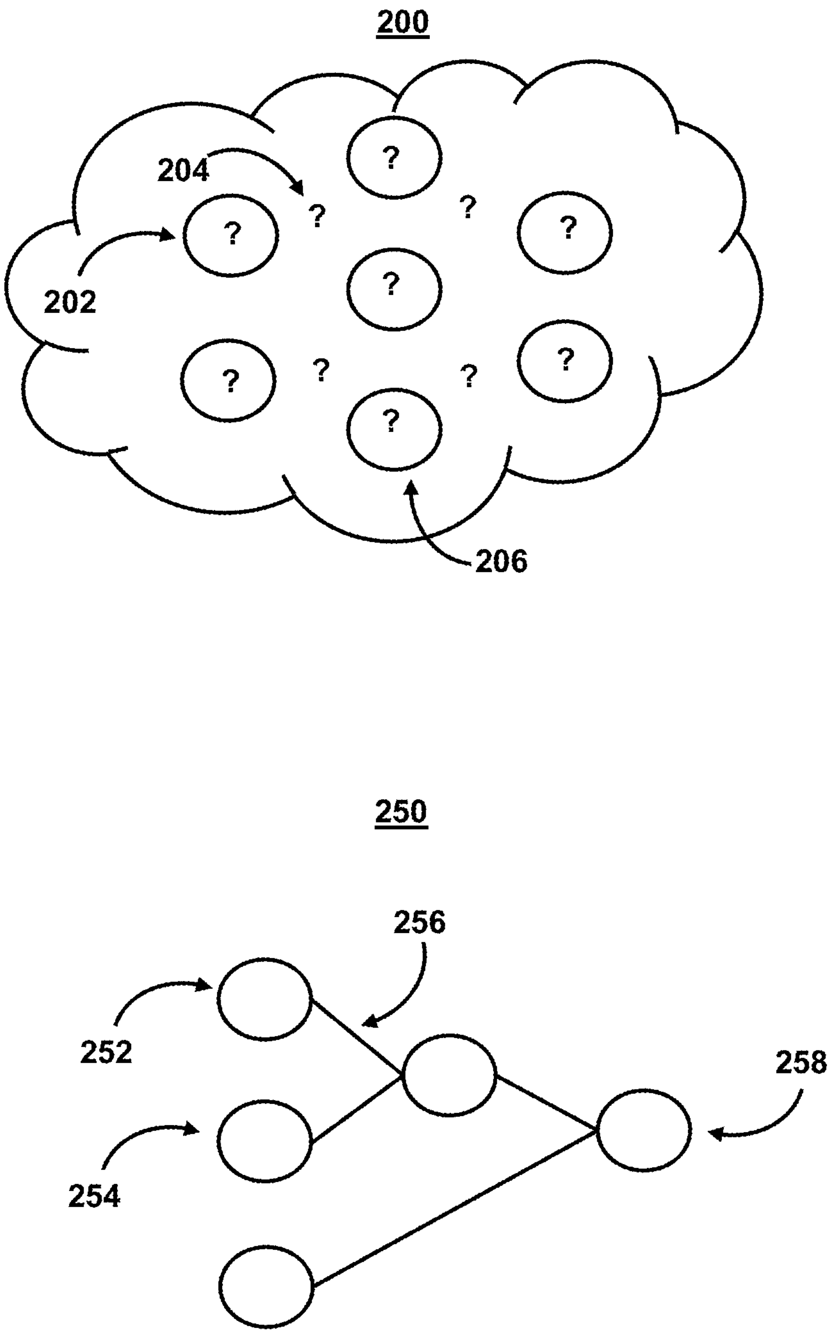
FIG. 2 shows an illustrative diagram for determining unknown characteristics of a model, in accordance with one or more embodiments.

FIG. 2 shows an illustrative diagram for determining unknown characteristics of a model, in accordance with one or more embodiments. For example, the first model may comprise a deep learning network (or other model) with a plurality of unknown characteristics, wherein the plurality of unknown characteristics is used to process inputs to the first model to generate outputs. For example, model 200 may comprise unknown feature 202, unknown connection 204, and/or unknown layer 206.

As described herein, the system may detect unknown characteristics of a model. For example, characteristics may include attributes, properties, and/or features that describe and/or affect the model's behavior, capabilities, and/or performance. The specific characteristics of an artificial intelligence model can vary widely depending on its type, purpose, and complexity. For example, a model may include unknown characteristics such as variables, parameters, weights, layers, and/or other determinations (as well as characteristics therefor).

For example, unknown characteristics may include input variables (or features). Input variables may include independent variables, categorical variables, and/or numerical variables. Independent variables are the input features or attributes used to make predictions or decisions.

They represent the information or data that the model takes as input. For example, in an image recognition model, the pixels of an image are independent variables. Categorical variables are discrete variables that represent categories or labels. Examples include product categories, gender, or city names. Numerical variables are continuous variables that represent quantities. They can include measurements such as temperature, age, or income. The system may read unknown characteristics and identifies the relevant variables for a domain being modeling, which become Bayesian network nodes. The system may identify the conditional dependencies between the nodes based on their logical relationships and unknown characteristics. These will form the edges between nodes. The system may define the state space for each variable (e.g., binary, discrete values, continuous values).

Unknown characteristics may also include output variables (or targets) such as dependent variables, categorical targets, and/or numerical targets. For example, dependent variables are the variables that the model aims to predict or estimate based on the input features. For example, in a weather forecasting model, the temperature for a future date is the dependent variable. Categorical targets are discrete output variables representing classes or categories. For instance, in a spam email classifier, the target variable is binary (spam or not spam). Numerical targets are continuous output variables that represent quantities. In a regression model predicting house prices, the target variable is a numerical value.

Unknown characteristics may include model parameters (e.g., learned variables) such as weights and biases as well as hyperparameters. The model parameters are weights and biases that are learned during the training process. These variables determine the relationships between input features and output predictions. They are adjusted iteratively to minimize the model's prediction error. Hyperparameters are settings or configurations that are not learned from data but are set before training. Examples include learning rate, batch size, and the number of layers in a neural network.

Unknown characteristics may include hidden variables (e.g., latent variables). For example, in some models, there are hidden or latent variables that are not directly observed in the data but are inferred by the model. These are often used in probabilistic models and dimensionality reduction techniques like principal component analysis (PCA) or factor analysis. Latent variables may include state variables (e.g., for recurrent models). State variables may be, in recurrent neural networks (RNNs) and sequential models, state variables that capture the model's internal state at a particular time step. These variables allow the model to maintain memory of previous inputs and computations.

Unknown characteristics may include control variables (e.g., for decision models). Control variables represent the actions or decisions to be taken based on input data. For example, in reinforcement learning, control variables specify which action to take in a particular state.

Unknown characteristics may include auxiliary variables. Auxiliary variables may be variables that may not directly contribute to the model's primary task but are used to assist in training or regularizing the model. Examples include dropout masks in neural networks or auxiliary loss terms. In some embodiments, the system may generate simulation engine constructs for the Bayesian network by connecting nodes and their conditional dependent variables. The system may generate a white box simulation engine that parameterizes the Bayesian network by specifying the conditional probability table for each node. The system may generate simulation engine loads with unknown characteristics and utilize probabilistic inference using the Bayesian model to identify root causes.

Unknown characteristics may include environment variables. For example, in robotics and control systems, these represent variables related to the physical or simulated environment in which the model operates. They can include sensor data, motor commands, or environmental parameters.

In some embodiments, the system may utilize unknown characteristics to create what-if user questions. The system may query users' questions about the variables and user beliefs, making revisions to the Bayesian network components. The system may query users review and validate questions, which are used to retrain the AGI and update the Bayesian model and/or submit feedback to retrain the AGI and reformat the Bayesian model. The system may query users for review and validation of what-if scenarios.

As shown in FIG. 2, the system may generate a second model corresponding to the first model, wherein the second model comprises a probabilistic graphical model corresponding to the first model, and wherein the probabilistic graphical model is trained to determine probabilities for graphical characteristics corresponding to the plurality of unknown characteristics.

As described herein, a probabilistic graphical model may be a model for representing and reasoning about uncertainty and probabilistic relationships in complex systems, including one or more models. The probabilistic graphical model may combine elements of probability theory and graph theory to represent and solve problems involving uncertain or interrelated variables. Probabilistic graphical models are commonly used in various fields, including machine learning, artificial intelligence, statistics, and data science.

In some embodiments, the probabilistic graphical model may comprise a Bayesian network or directed graphical model. In a Bayesian network, variables are represented as nodes, and probabilistic dependencies between variables are represented as directed edges (arcs) between nodes. Each node in the Bayesian network corresponds to a random variable, and the edges represent conditional dependencies between these variables. Specifically, an edge from node A to node B indicates that B depends probabilistically on A. Bayesian networks are used for modeling cause-and-effect relationships, making predictions, and performing probabilistic inference. Conditional probability tables (CPTs) associated with each node specify the conditional probability distribution of that node given its parent nodes. Bayesian networks are particularly useful for representing and reasoning about uncertainty and probabilistic relationships in domains such as healthcare diagnosis, fraud detection, and natural language processing.

In some embodiments, the probabilistic graphical model may comprise Markov random fields (MRFs) or undirected graphical models. In a Markov random field, variables are represented as nodes, and their relationships are represented as undirected edges (edges without arrows). Markov random fields are used to model joint probability distributions over a set of variables. They capture the concept of "Markov properties" or "conditional independence" between variables. Unlike Bayesian networks, Markov random fields do not specify causal relationships explicitly but focus on capturing the probability distribution of a set of variables. Factors, which are functions of subsets of variables, define the joint probability distribution over variables. These factors are associated with edges in the graph. Markov random fields are widely used in image analysis, computer vision, and spatial modeling, where spatial or contextual dependencies between variables are important.

As shown in FIG. 2, the system may determine a plurality of graphical characteristics (e.g., node 252, node 254, edge 256, output 258 of model 250) and/or probabilities therefor. As described herein, the system may determine probabilities for graphical characteristics corresponding to a plurality of unknown characteristics. A graphical characteristic may comprise any characteristic of a probabilistic graphical model that distinguishes the probabilistic graphical model from another probabilistic graphical model. The graphical characteristics may comprise a graphical representation. For example, Bayesian networks are represented as directed acyclic graphs (DAGs). In these graphs, nodes represent random variables, and directed edges (arrows) indicate probabilistic dependencies between the variables. The absence of cycles ensures that the model can be used for efficient probabilistic inference. The graphical characteristic may comprise a conditional independence. For example, the edges in a Bayesian network encode conditional independence relationships between variables. Specifically, an edge from node A to node B means that B depends probabilistically on A, but B is conditionally independent of all other variables given A and its parents.

The graphical characteristic may comprise nodes and CPTs. For example, each node in a Bayesian network is associated with a random variable and a CPT. The CPT specifies the conditional probability distribution of the node given its parents in the graph. It quantifies how the variable's values depend on the values of its parents. The graphical characteristic may comprise modularity associated with a portion of the probabilistic graphical model. For example, Bayesian networks may be decomposed in complex joint probability distributions into smaller, more manageable conditional probabilities. This modularity simplifies the modeling process and allows for the efficient updating of probabilities as new evidence is observed. The graphical characteristic may comprise probabilistic reasoning associated with a portion of the probabilistic graphical model. For example, Bayesian networks are used for probabilistic reasoning and inference. They enable calculations of posterior probabilities, conditional probabilities, and predictions based on observed evidence or data. The graphical characteristic may comprise causality modeling associated with a portion of the probabilistic graphical model. For example, Bayesian networks are well-suited for modeling causal relationships between variables. The directed edges in the graph imply causal connections, making it possible to reason about cause and effect.

The graphical characteristic may comprise evidence or observations. For example, Bayesian networks can be updated with new evidence or observations. This updating process, known as Bayesian inference, allows the model to incorporate real-world data and adjust its probabilities accordingly. The graphical characteristic may comprise missing data, explanations for their predictions and decisions (e.g., a graphical structure of the model allows users to understand the relationships between variables and trace the reasoning process), and other information from various domains, including medical diagnosis, risk assessment, natural language processing, recommendation systems, etc.

In some embodiments, the system may use a Bayesian network to run in reverse to identify potential root causes and/or upstream factors that have influenced an event or observation. For example, the system may estimate the probability distribution of the variables in a network given evidence or observations. For example, the system may determine the most likely values of certain variables based on what the system knows (or what has been defined) about other variables in the network.

The system may start with a Bayesian network that represents the relationships between variables. The network may comprise nodes (representing variables) and edges (representing probabilistic dependencies). Each node has a conditional probability distribution that describes how it depends on its parent nodes. The system may set a node representing the event/observation as "evidence" with one-hundred percent probability. The system may also identify the variable(s) for which the system wants to perform reverse inference (e.g., variables whose values need to be determined based on the evidence). The system may also gather information or evidence about one or more variables in the network. This evidence can be in the form of observed data or known values for certain variables. For example, evidence may be provided in the form of conditional probabilities or likelihoods.

The system may then run the Bayesian inference to calculate the revised probabilities propagating backwards through the network. To run the Bayesian network in reverse, the system may need to perform probabilistic inference. This may include enumerating all possible values of the target variable(s) while taking into account the evidence and the conditional probabilities in the network. This may be computationally expensive for large networks, so the system may also eliminate variables from the network that are not relevant to the inference task, reducing the complexity of the computation.

The system may then identify nodes with increased posterior probabilities as possible contributors or causes for investigation. For example, after performing inference, the system may obtain the posterior probability distribution for the target variable(s). This distribution represents the likelihood of different values for the target variable(s) given the observed evidence. Notably, the further back in the network, the more indirect the potential influence of that node on the event. Accordingly, the system may run an iterative process at each level of nodes.

The system may then review the conditional probability tables to assess the relative strength of connections. For example, the system may use the posterior distribution to make inferences or predictions about the target variable(s). For example, the system finds the most likely value (maximum a posteriori estimation) or compute credible intervals. The system may repeat the inference process to update your estimates of the target variable(s).

In some embodiments, the system may determine a first graphical characteristic of the graphical characteristics corresponding to the compliance requirement and/or a probability thereof. The system may represent probabilities in one or more manners. For example, in situations where all outcomes are equally likely, classical probability can be used. In real-world situations, probabilities are often estimated based on observed data. The relative frequency of an event occurring in a large number of trials can be used as an estimate of its probability. The system may use subjective probability, which is based on an individual's personal judgment or belief about the likelihood of an event. It is often used when objective data is not available. For example, the system may use conditional probability to assess the likelihood of an event "E" occurring given that another event "F" has already occurred. The system may use Bayesian probability, which combines prior information or beliefs (prior probability) with observed evidence to update the probability (posterior probability) of an event using Bayes' theorem.

In situations involving multiple events, the probability of a combination of events can be determined by applying principles of combinatorics. For example, the system may use these principles to calculate the probability of drawing a specific sequence of cards from a deck. For complex problems or situations with uncertainty, Monte Carlo simulations can be used to estimate probabilities. Simulations involve generating random samples of data to approximate probabilities. In statistics and machine learning, various models, such as logistic regression or decision trees, can be used to model and estimate probabilities based on observed data and predictor variables.

In some embodiments, the probability (or training data used to train a model to determine a probability) may be based on historical data. Historical data and records can be analyzed to estimate probabilities. For example, historical weather data can be used to estimate the probability of rainfall on a specific date.

In some embodiments, the system may compare the first probability to a threshold probability to determine whether the first model corresponds to the compliance requirements. The system may generate for display, on a user interface, a recommendation based on comparing the first probability to the threshold probability. Threshold probabilities may be used in models, particularly in classification and decision-making tasks, to make binary decisions or predictions. These thresholds may determine whether a model's output should be classified as one class (positive) or another class (negative) based on the predicted probabilities or scores generated by the model.

For example, in binary classification tasks, the model may predict whether an instance belongs to one of two classes: positive (e.g., "spam") or negative (e.g., "not spam"). The model generates a probability or score for each instance, indicating the likelihood that it belongs to the positive class. This probability can range from 0 to 1. A threshold probability is chosen to determine the classification. If the predicted probability exceeds the threshold, the instance is classified as positive; otherwise, it is classified as negative.

The threshold can be set at different values between 0 and 1, depending on the desired trade-off between true positives and false positives. Increasing the threshold tends to result in fewer false positives but more false negatives, while decreasing the threshold has the opposite effect. The threshold can be determined through various methods, such as domain expertise, cost-sensitive analysis, or optimization based on the specific application.

In some embodiments, the system may use a receiver operating characteristic (ROC) curve. The ROC curve is a graphical representation that helps in threshold selection. It plots the true positive rate (sensitivity) against the false positive rate (1-specificity) at different threshold values. The threshold that provides the desired balance between true positives and false positives can be chosen based on the ROC curve.

Another consideration in threshold selection is the trade-off between precision and recall. Lowering the threshold tends to increase recall (the proportion of true positives identified) but may reduce precision (the proportion of true positives among positive predictions). In some applications, the choice of the threshold may depend on the specific requirements and consequences of false positives and false negatives. For example, in medical diagnosis, a higher threshold might be chosen to avoid false positives. In cases of class imbalance (where one class is much less frequent than the other), threshold adjustment can be used to address the imbalance. By selecting a threshold that balances precision and recall, the model can give more weight to the minority class.

In some embodiments, the system may perform F1 score optimization. The F1 score, which is the harmonic mean of precision and recall, can be used as a criterion for threshold optimization. Maximizing the F1 score helps find an optimal threshold for the given problem. In some cases, models may produce probabilities that are not well-calibrated, meaning that the predicted probabilities do not accurately reflect the true likelihood of events. Threshold calibration techniques can be used to improve the reliability of threshold-based decisions.

Figure 3A:
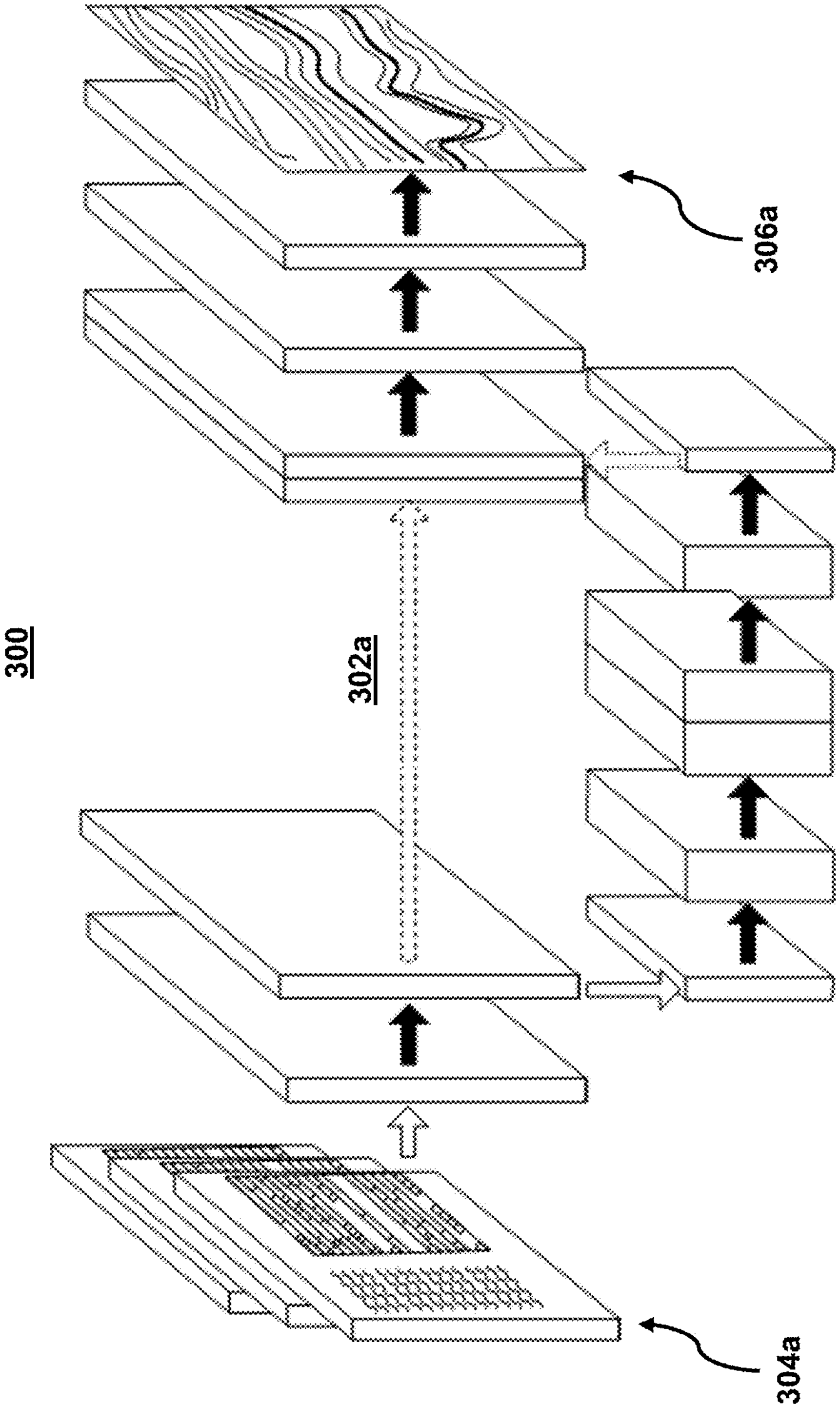
FIGS. 3A-B show illustrative components for a system used to monitor compliance of artificial intelligence models, in accordance with one or more embodiments.
Figure 3B:
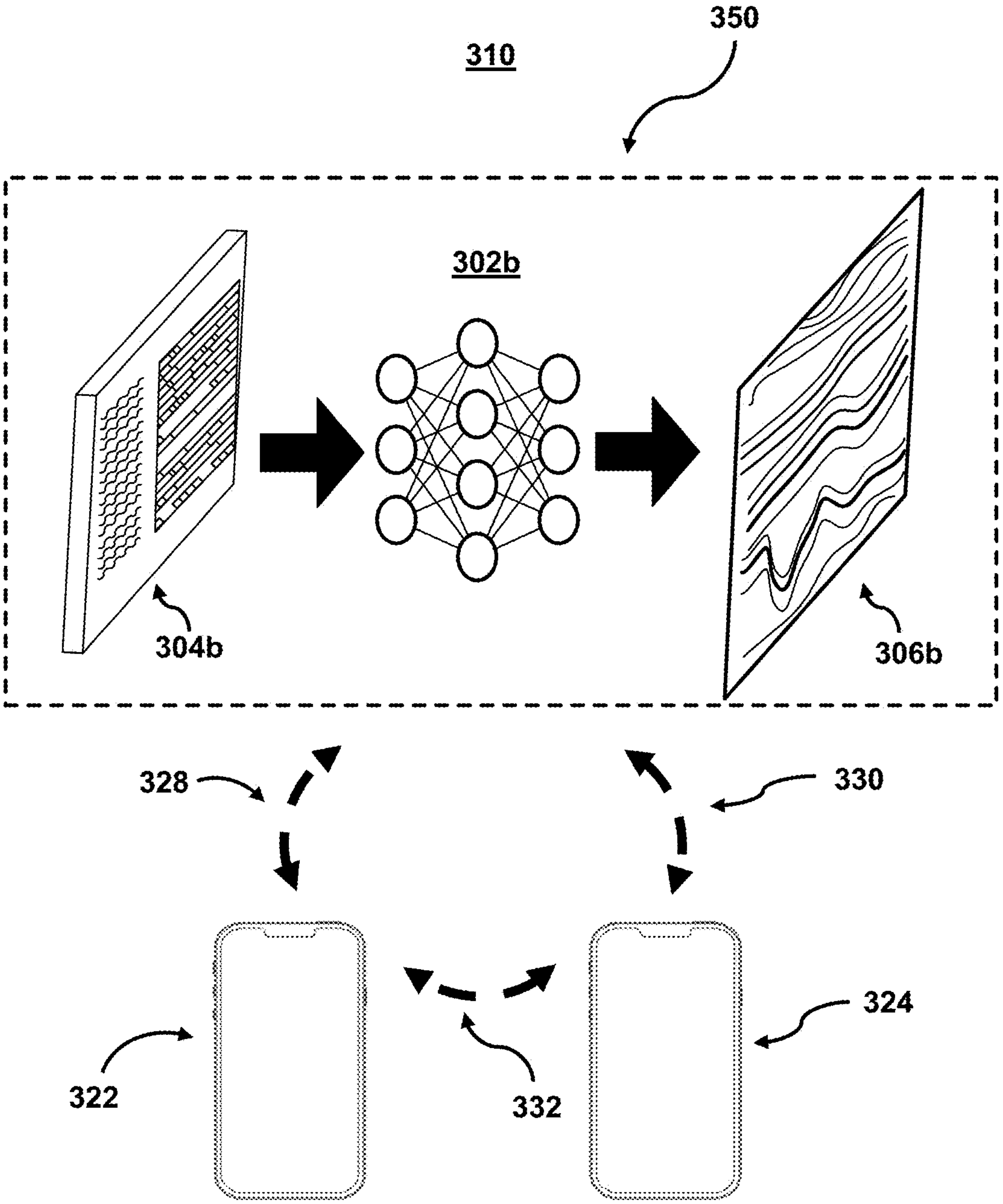

FIGS. 3A-B show illustrative components for a system used to monitor compliance of artificial intelligence models, in accordance with one or more embodiments. As shown in FIG. 3A, system 300 may include model 302*a*, which may be a machine learning model, an artificial intelligence model, etc. Model 302*a* may take inputs 304*a* and provide outputs 306*a*. The inputs may include multiple datasets, such as a training dataset and a test dataset. Each of the plurality of datasets (e.g., inputs 304*a*) may include data subsets related to user data, predicted forecasts and/or errors, and/or actual forecasts and/or errors. In some embodiments, outputs 306*a* may be fed back to model 302*a* as input to train model 302*a* (e.g., alone or in conjunction with user indications of the accuracy of outputs 306*a*, labels associated with the inputs, or other reference feedback information). For example, the system may receive a first labeled feature input, wherein the first labeled feature input is labeled with a known prediction for the first labeled feature input. The system may then train the first model to classify the first labeled feature input with the known prediction (e.g., a probability of a graphical characteristic).

In a variety of embodiments, model 302*a* may update its configurations (e.g., weights, biases, or other parameters) based on the assessment of its prediction (e.g., outputs 306*a*) and reference feedback information (e.g., user indication of accuracy, reference labels, or other information). In a variety of embodiments, where model 302*a* is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302*a* may be trained to generate better predictions.

In some embodiments, the model (e.g., model 302*a*) may automatically perform actions based on outputs (e.g., outputs 306*a*). In some embodiments, the model (e.g., model 302*a*) may not perform any actions. The output of the model (e.g., model 302*a*) may be used to determine a probability of a graphical characteristic.

The system may generate simulation engine runs scenarios utilizing Bayesian model and generate prediction of scenario outcome. The system may read and retrain with results of scenarios, root cause analysis, and user reviews and validation. The system may generate simulation engine read real time updates of event data and provide alerts when potential outcomes exceed programmed parameters. The system may provide suggested dynamic changes to programmed parameters as event data is input. The system may aid users to test new parameters by running scenarios with real or synthetic data across the Whitebox simulation engine. The models may be continuously retrained and Bayesian networks updated and refreshed by means of data provided by Enterprise databases connected dynamically to a storage system read by the simulation engine and AGI that is designed for high-throughput ingestion, low latency reads, and scalability across large distributed data clusters.

FIG. 3B shows illustrative components for a system used to monitor compliance of artificial intelligence models, in accordance with one or more embodiments. For example, FIG. 3B may show illustrative components for an observer model. As shown in FIG. 3B, system 310 may include mobile device 322 and mobile device 324. While shown as smartphones in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system, and may feature one or more component devices. It should be noted that, while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 310 may be partially based on API layer 350, such that there is strong adoption of SOAP and RESTful Web services, using resources like Service Repository and Developer Portal, but with low governance, standardization, and separation of concerns. Alternatively, system 310 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302*b* may be trained by taking inputs 304*b* and provide outputs 306*b*. Model 302*b* may include an artificial neural network. In such embodiments, model 302*b* may include an input layer and one or more hidden layers. Each neural unit of model 302*b* may be connected with many other neural units of model 302*b*. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302*b* may be self-learning and trained, rather than explicitly programmed, and can perform significantly better in certain areas of problem solving, as compared to traditional computer programs. During training, an output layer of model 302*b* may correspond to a classification of model 302*b*, and an input known to correspond to that classification may be input into an input layer of model 302*b* during training. During testing, an input without a known classification may be input into the input layer, and a determined classification may be output.

In some embodiments, model 302*b* may include multiple layers (e.g., where a signal path traverses from front layers to back layers). In some embodiments, backpropagation techniques may be utilized by model 302*b* where forward stimulation is used to reset weights on the "front" neural units. In some embodiments, stimulation and inhibition for model 302*b* may be more free-flowing, with connections interacting in a more chaotic and complex fashion. During testing, an output layer of model 302*b* may indicate whether or not a given input corresponds to a classification of model 302*b* (e.g., a probability of a graphical characteristic).

Model 302*b* is shown as a convolutional neural network. A convolutional neural network consists of an input layer (e.g., input 304*b*), hidden layers, and an output layer (e.g., output 306*b*). As shown in FIG. 3B, the middle layers are called hidden because their inputs and outputs are masked by the activation function and final convolution. In a convolutional neural network, the hidden layers include layers that perform convolutions. Model 302*b* may comprise convolutional layers that convolve the input and pass its result to the next layer. Model 302*b* includes local and/or global pooling layers along with traditional convolutional layers. Pooling layers reduce the dimensions of data by combining the outputs of neuron clusters at one layer into a single neuron in the next layer. Also as shown, model 302*b* may comprise fully connected layers that connect every neuron in one layer to every neuron in another layer.

Figure 4:
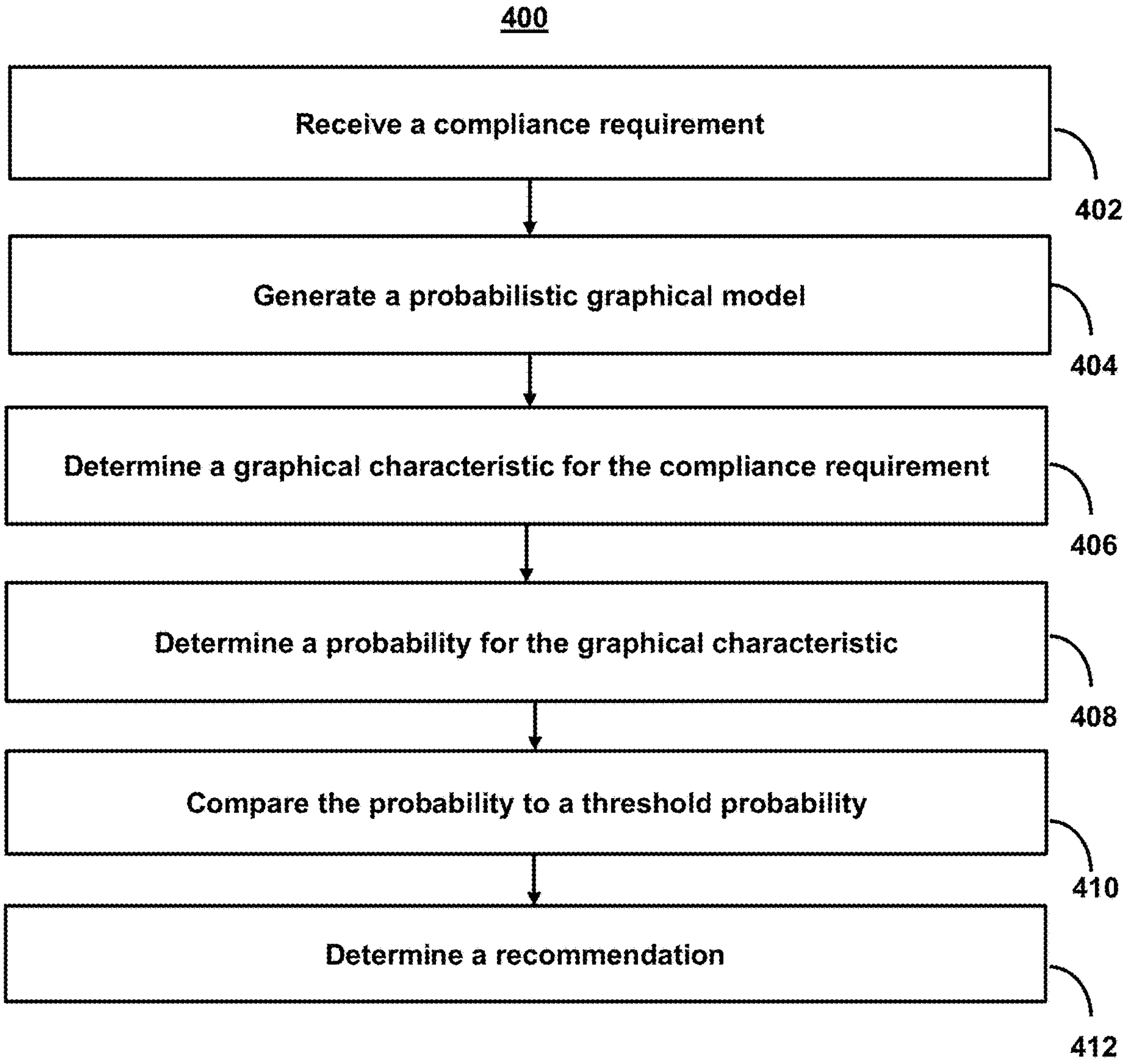
FIG. 4 shows a flowchart of the steps involved in monitoring compliance of artificial intelligence models, in accordance with one or more embodiments.

FIG. 4 shows a flowchart of the steps involved in monitoring compliance of artificial intelligence models, in accordance with one or more embodiments. For example, the system may use process 400 (e.g., as implemented on one or more system components described above) in order to monitor data security compliance of artificial intelligence models using an observer model. In some examples, the system may be used for Anti-Money Laundering, Fraud detection (e.g., credit card fraud), Operational risk management, and/or FRB Comprehensive Capital Analysis and Review (CCAR) and Dodd-Frank Act stress test exercises.

At step 402, process 400 (e.g., using one or more components described above) receives a compliance requirement. For example, the system may receive a compliance requirement for a first model, wherein the first model comprises a plurality of unknown characteristics, and wherein the plurality of unknown characteristics is used to process inputs to the first model to generate outputs.

At step 404, process 400 (e.g., using one or more components described above) generates a probabilistic graphical model. For example, the system may generate a second model corresponding to the first model, wherein the second model comprises a probabilistic graphical model corresponding to the first model, and wherein the probabilistic graphical model is trained to determine probabilities for graphical characteristics corresponding to the plurality of unknown characteristics. To train the probabilistic graphical model, the system may receive training data, wherein the training data is based on inputs to the first model, outputs from the first model, and known characteristics of the first model. For example, the system may train itself to determine probabilities and/or graphical characteristics for the second model that mirror, represent, and/or mimic the results for the first model.

In some embodiments, the system may determine the graphical characteristics using training data for a given model that may comprise known relationships, architecture attributes, and, in some cases, aggregations of information based on individual permutation-based and feature-specific results. For example, the system may receive Shapley values corresponding to features in the first model. The system may determine the graphical characteristics using training data for a given model that may comprise known relationships, architecture attributes, and, in some cases, aggregations of information based on individual permutation-based and feature-specific results. To compute Shapley values, the system considers all possible permutations (orderings) of the features and calculates the marginal contribution of each feature when added to the coalition of features that came before it. The system may perform this process for all possible orderings, and the contributions are averaged across all permutations.

In some embodiments, the system may receive training data, wherein the training data comprises results of a recursive feature elimination performed on the first model. The system may train the second model based on the results. For example, recursive feature elimination is an iterative method whereby features are ranked based on their importance, and the least important features are removed one by one until a desired number of features is reached.

In some embodiments, the system may receive training data, wherein the training data comprises results of least absolute shrinkage and selection operators performed on the first model. The system may train the second model based on the results. For example, least absolute shrinkage and selection operators is a linear regression technique that introduces L1 regularization. As a result, some features are shrunk to zero, effectively selecting the most important ones.

In some embodiments, the system may receive training data, wherein the training data comprises permutation importance values for features in the first model. The system may aggregate the permutation importance values to generate an aggregated set. The system may train the second model based on the aggregated set. For example, the importance of a feature is calculated by measuring how much the model's performance (e.g., accuracy, F1 score) deteriorates when the values of that feature are randomly shuffled. If a feature is crucial for the model's predictions, shuffling the feature's values will result in a significant drop in performance.

In some embodiments, the system may receive training data, wherein the training data comprises principal component analysis values for features in the first model. The system may aggregate the principal component analysis values to generate an aggregated set. The system may train the second model based on the aggregated set. For example, principal component analysis can be used to reduce the dimensionality of the data and identify the principal components (combinations of features) that explain the most variance in the dataset.

At step 406, process 400 (e.g., using one or more components described above) determines a graphical characteristic for the compliance requirement. For example, the system may determine a first graphical characteristic of the graphical characteristics corresponding to the compliance requirement.

In some embodiments, the system may determine similarities between graphical characteristics and compliance requirements. For example, the system may input the first compliance requirement into a database listing graphical characteristics that correspond to compliance requirements. The system may then receive an output from the database indicating that the compliance requirement corresponds to the first graphical characteristic. In some embodiments, the database may be populated based on historical data and/or data received from one or more third parties.

In some embodiments, the system may train a second model while continuing to use the first model. To do so, the system may generate a snapshot of the first model and train the second model on the snapshot. A "snapshot" of a model may refer to a saved state or representation of the model at a specific point in time. This snapshot includes the model's architecture, learned parameters (weights and biases), hyperparameters, and any other relevant information needed to re-create and use the model exactly as it was at the time of the snapshot.

In some embodiments, the system may train the second model on known and unknown characteristics of the first model. For example, while the second model may be generated based on unknown characteristics, the system may also use any known characteristics to improve the performance of the first model. For example, a known characteristic may include the model's architecture, which defines its structure and layers (e.g., neural network layers in a deep learning model), and the values of its learned parameters (weights and biases). Additionally or alternatively, the system may comprise hyperparameters. Hyperparameters are settings and configurations that are not learned from the data but are set before or during the training process. Examples include learning rates, batch sizes, dropout rates, and the number of layers in a neural network. These hyperparameters are typically saved in the snapshot to reproduce the training conditions.

In some embodiments, the system may train the second model on known and unknown characteristics of the first model. For example, while the second model may be generated based on unknown characteristics, the system may also use any known characteristics to improve the performance of the first model. For example, a known characteristic may comprise information about the model's training history (e.g., which may be included in the snapshot). This can include training loss, validation loss, accuracy, and other metrics recorded during the training process. This information helps users understand how the model performed during training.

In some embodiments, the system may train the second model based on the differences in versions of the first model. For example, the system may receive a first version of the first model. The system may receive a second version of the first model. The system may determine a difference between the first version and the second version. The system may train the second model based on the difference. For example, by saving (and analyzing) the model state at different points in time, the system can track changes, compare model versions, and reproduce results.

In some embodiments, the system may train the second model based on a previous version of the second model. For example, the system may use transfer learning to limit the time required to train a model. For example, in transfer learning, pre-trained models are used as a starting point for training new models on related tasks. For example, snapshots of pre-trained models are used to initialize the new models, saving time and resources.

At step 408, process 400 (e.g., using one or more components described above) determines a probability for the graphical characteristic. For example, the system may determine a first probability of the probabilities corresponding to the first graphical characteristic. In some embodiments, the probability (or training data used to train a model to determine a probability) may be based on historical data. Historical data and records can be analyzed to estimate probabilities. For example, historical weather data can be used to estimate the probability of rainfall on a specific date.

At step 410, process 400 (e.g., using one or more components described above) compares the probability to a threshold probability. For example, the system may compare the first probability to a threshold probability to determine whether the first model corresponds to the compliance requirements.

In some embodiments, the system may determine that multiple graphical characteristics correspond to a given compliance requirement. In such cases, the system may determine a second graphical characteristic of the graphical characteristics corresponding to the compliance requirement. The system may determine a second probability of the probabilities corresponding to the first graphical characteristic. The system may aggregate the first probability and the second probability to generate an aggregated probability. The system may compare the aggregated probability to the threshold probability.

At step 412, process 400 (e.g., using one or more components described above) determines a recommendation. For example, the system may generate for display, on a user interface, a recommendation based on comparing the first probability to the threshold probability.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
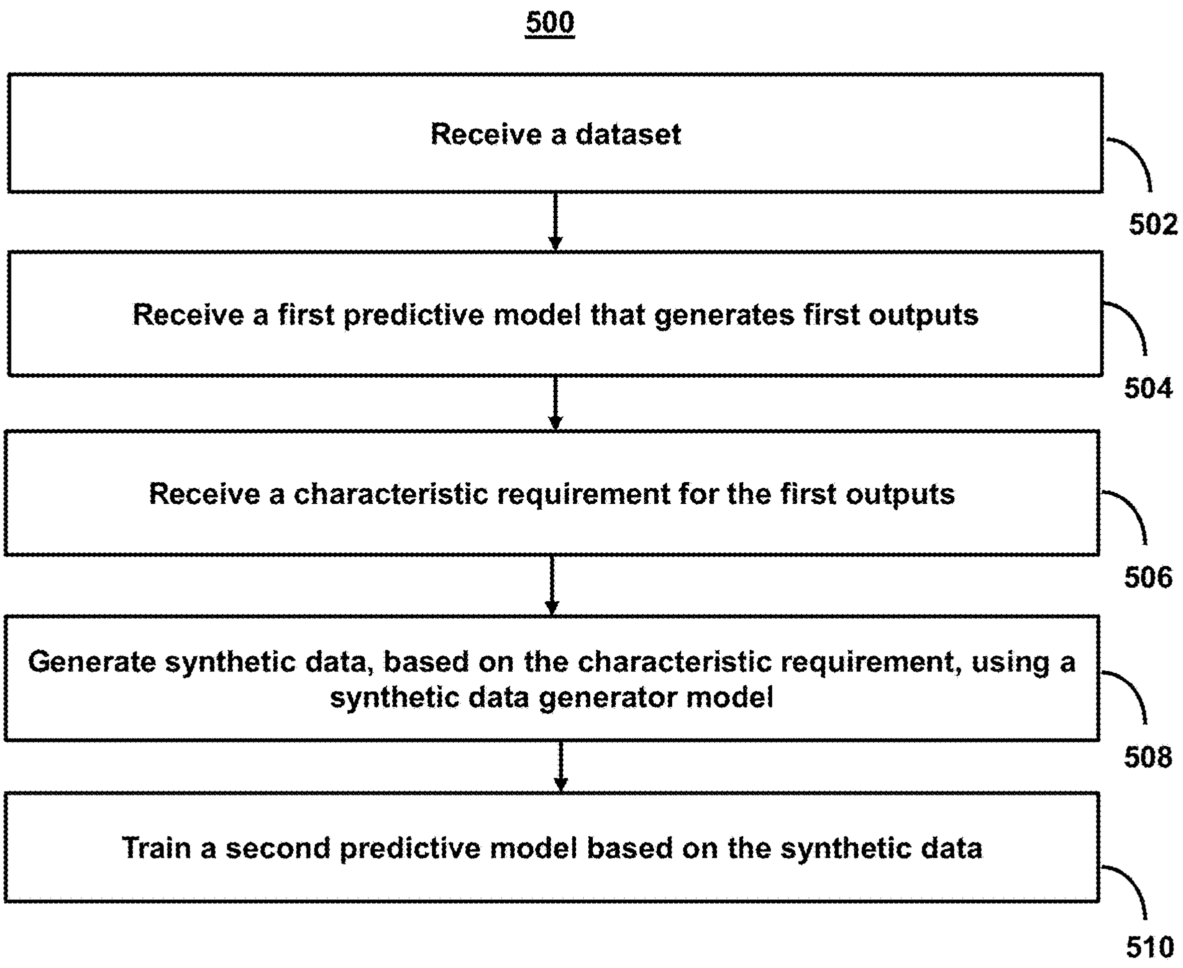
FIG. 5 shows a flowchart of the steps involved in mitigating hindsight bias related to training and using artificial intelligence models, in accordance with one or more embodiments.

FIG. 5 shows a flowchart of the steps involved in mitigating hindsight bias related to training and using artificial intelligence models, in accordance with one or more embodiments. For example, the system may use process 500 (e.g., as implemented on one or more system components described above) in order to mitigate hindsight bias related to training and using artificial intelligence models for outlier events by applying model constraints to synthetic data generator models. In some examples, the system may be used for Anti-Money Laundering, Fraud detection (e.g., credit card fraud), Operational risk management, and/or FRB Comprehensive Capital Analysis and Review (CCAR) and Dodd-Frank Act stress test exercises. For example, the system may be used to detect black swan events (or other outlier events) in these environments.

At step 502, process 500 (e.g., using one or more components described above) receives a dataset. For example, the system may receive a first dataset, wherein the first dataset comprises actual historical data over a first time period. For example, the system may leverage a diverse array of datasets, each chosen based on the model's specific objectives, application domain, and the nature of the AI technique. Structured data, such as tabular datasets and time series, are foundational for traditional machine learning models applied across finance, healthcare, and retail for tasks ranging from predictive analytics to demand forecasting. Unstructured data, encompassing text, images, audio, and video, plays a crucial role in more complex models, facilitating advancements in natural language processing, computer vision, and speech recognition. These datasets are instrumental in developing applications like chatbots, image recognition systems, and automated translation services. Semi-structured data, including XML and JSON formats, offers flexibility and structure, supporting a wide range of applications from web data processing to inter-system communications. Synthetic data, artificially generated to mimic or augment real-world data, addresses challenges related to data scarcity, privacy, and model robustness, enabling more inclusive and comprehensive training scenarios. Specialized datasets, such as geospatial for mapping and urban planning, biometric for security systems, and graph data for network analysis, cater to niche applications requiring detailed and specific data types. The advent of multimodal datasets, which combine various data types like text, images, and audio, underscores the move towards more sophisticated systems capable of understanding and processing complex, multifaceted inputs. The choice of dataset—be it for supervised, unsupervised, or reinforcement learning—hinges on factors such as the problem scope, data availability, and the computational resources at hand.

At step 504, process 500 (e.g., using one or more components described above) receives a first predictive model that generates first outputs. For example, the system may receive a first predictive model that generates first outputs, wherein the first predictive model is trained on the first dataset, wherein the first outputs have a first plurality of characteristics.

At step 506, process 500 (e.g., using one or more components described above) receives a characteristic requirement for the first outputs. For example, the system may receive a first characteristic requirement for the first outputs, wherein the first characteristic requirement comprises a required threshold for a first characteristic in the first plurality of characteristics.

In some embodiments, the system may select a model constraint corresponding to the characteristic requirement. To select one or more features in the outputs of a model for defining a characteristic requirement, based on a model constraint, involves the system using a structured approach that integrates domain knowledge, model behavior analysis, and/or the specific objectives of the model's application. For example, the system may identify the constraints that the model must adhere to. These constraints could be derived from business objectives, regulatory requirements, operational needs, or specific goals related to accuracy, fairness, interpretability, or ethical considerations. The system may analyze how these constraints impact the model's functioning and outputs. For instance, a constraint might be to minimize false positives in a predictive model used for screening applications, or to ensure diversity in the recommendations provided by a recommendation system. The system may investigate the model to understand which features significantly impact its outputs. This could involve techniques like feature importance scoring, sensitivity analysis, or other model interpretability tools. The system may map the identified features to the model constraints to determine which features are most relevant to the constraints. For example, if a constraint involves minimizing risk in financial lending, features related to credit history or debt-to-income ratio might be prioritized. Based on the analysis, the system may select one or more features that are directly linked to the model constraint and critical for achieving the desired model behavior. The selection should focus on features that, when adjusted or optimized, would enable the model to meet or exceed the defined constraint. The system may define the characteristic requirement in terms of the selected features. This involves specifying the expected behavior, range, or statistical properties of these features in the model's outputs. The requirement should be aligned with the model constraint and measurable to facilitate objective assessment.

The system may integrate the characteristic requirement into the model development process. This might involve adjusting the model architecture, training process, or data preprocessing to emphasize the importance of the selected features in meeting the model constraint. The system may validate the model's performance by specifically assessing how well the outputs for the selected features meet the characteristic requirement. This could include using specialized validation datasets, applying targeted metrics, or conducting scenario-based testing to ensure compliance with the constraint. The system may use feedback from the validation process to refine the selection of features, the definition of the characteristic requirement, or the model itself. This iterative process ensures continuous alignment between the model's outputs and the overarching constraint. Once deployed, the system may continuously monitor the model to ensure that the selected features continue to meet the characteristic requirement under evolving real-world conditions. Adjust as necessary to maintain compliance with the model constraint.

At step 508, process 500 (e.g., using one or more components described above) generates synthetic data, based on the characteristic requirement, using a synthetic data generator model. For example, the system may generate first synthetic data using a synthetic data generator model, wherein the first synthetic data comprises synthetic historical data over the first time period, wherein the synthetic data generator model is trained to generate the first synthetic data, and wherein training the synthetic data generator model comprises applying a model constraint to the synthetic data generator model during training, wherein the model constraint is based on the first characteristic requirement being met in second outputs of the first predictive model when the first synthetic data is processed by the first predictive model.

In some embodiments, generating the first synthetic data further comprises validating the first synthetic data. The system may perform this by inputting the first synthetic data into the first predictive model to generate the second outputs, wherein the second outputs have a second plurality of characteristics and determining to validate the first synthetic data by determining that the first characteristic in the second plurality of characteristics meets the first characteristic requirement. For example, the system may generate and validate synthetic data to ensure it meets specific characteristic requirements. As described, the system may utilize a synthetic data generation model to create the first set of synthetic data. This model may be based on techniques such as Generative Adversarial Networks (GANs), Variational Autoencoders (VAEs), or other generative models designed to produce data mimicking the characteristics of real datasets. The system may perform basic checks on the generated data to ensure it conforms to expected formats and ranges. This step might involve ensuring that numerical data falls within specific bounds or that categorical data includes only the expected categories.

The system may then validate the synthetic data by processing it through the first predictive model. For example, the system may input the synthetic data into a predictive model (e.g., the first predictive model). This model may have been previously trained or is being concurrently trained on actual data to predict outcomes or classify data based on learned patterns. The predictive model may process the synthetic data, generating outputs (e.g., second outputs) that reflect how the model interprets or classifies this data based on its training. These outputs have a range of characteristics, mirroring how the model would respond to real-world (e.g., actual) data.

The system may identify the first characteristic requirements that the synthetic data must meet when processed by the predictive model. This could relate to accuracy, distribution of predictions, sensitivity, specificity, or any other measurable outcome that indicates the synthetic data's utility for the intended application. The system may then assess the second outputs generated by the predictive model to determine if the first characteristic in the plurality of characteristics meets the predefined requirements. This step may involve statistical analysis, comparison with benchmarks, or other evaluation techniques appropriate to the characteristic being considered. The system may decide on the validation of the first synthetic data based on whether the evaluated characteristics meet the set requirements. If the data meets the requirements, it is validated and considered suitable for use; if not, adjustments may be needed either in the generation process, the model used for validation, or the characteristic requirements themselves.

In some embodiments, generating first synthetic data further comprises the system validating the first synthetic data by inputting the first synthetic data into the first predictive model to generate the second outputs, wherein the second outputs have a second plurality of characteristics and determining to validate the first synthetic data by determining that the first characteristic in the second plurality of characteristics meets the first characteristic requirement. The system may use different techniques and/or comparisons to validate the synthetic data based on the type of characteristic requirement and/or model constraint.

For example, the system may determine a first certainty for one or more features in the first outputs based on the model constraint and determine the first characteristic requirement based on the first certainty. The system may validate the first synthetic data by determining a second certainty for one or more features in the second outputs and comparing the second certainty to the first characteristic requirement. For example, the system may validate synthetic data through certainty comparison, the process begins by processing real data through a predictive model to establish a baseline for certainty levels, known as the first certainty. This baseline involves calculating confidence scores or probabilities for one or more features in the model's outputs, serving as the first characteristic requirement. Following this, synthetic data is generated with the aim of mirroring the statistical properties of the real data. This synthetic data is then fed into the same predictive model, and a second certainty is determined based on the model's outputs, mirroring the method used to calculate the first certainty. Validation of the synthetic data may occur through a direct comparison of the second certainty (associated with the synthetic data) against the first characteristic requirement (derived from the real data). The system sets validation criteria specifying how closely the second certainty needs to align with the first to deem the synthetic data valid. A close alignment suggests that the synthetic data realistically and accurately represents real-world complexities, thereby validating its use. If significant discrepancies are found, it indicates the need for refinement in the synthetic data generation process. This approach ensures the synthetic data not only statistically resembles real data but also behaves in a manner consistent with real-world expectations when analyzed or used for prediction, especially in domains where decision-making relies heavily on the confidence associated with predictive model outputs. The process is inherently iterative, allowing for continuous refinement of synthetic data generation techniques based on the comparison of certainty levels, until the synthetic data meets the established validation criteria.

In some embodiments, the system may determine a first range of values for one or more features in the first outputs based on the model constraint and determine the first characteristic requirement based on the first range of values. The system may then validate the first synthetic data by determining a second range of values for one or more features in the second outputs and comparing the second range of values to the first characteristic requirement. For example, the system processes real data through a predictive model to extract a set of outputs. Within these outputs, it identifies a first range of values for one or more targeted features. This range represents the variability and distribution of the features' values as the model processes actual, real-world data. This first range of values is crucial as it sets a benchmark for what is considered normal or expected behavior for these features in a real-world context, forming the basis for the first characteristic requirement. Upon generating synthetic data, the aim is to have this data mimic the real-world data closely in terms of how it is represented and how it behaves under similar conditions. The system then processes this synthetic data through the same predictive model to produce a set of second outputs. Like with the actual data, it identifies a second range of values for the same targeted features within these outputs. The validation of the synthetic data hinges on a comparative analysis between the first and second ranges of values. If the second range falls within or closely aligns with the first range, it indicates that the synthetic data possesses similar characteristics to real data, at least in the context of how the predictive model interprets it. This alignment validates the synthetic data, affirming its utility for tasks such as model training, testing, or simulation where real data's representation is critical. However, if the comparison reveals significant discrepancies between the two ranges, the synthetic data may require refinement. Adjustments might involve altering the data generation process to better capture the underlying distributions and correlations present in real data. This process is iterative, with each cycle aiming to reduce the discrepancies between the first and second ranges of values, thereby increasing the synthetic data's fidelity to real-world phenomena. This methodology ensures that synthetic data is not just statistically similar to real data but also functionally compatible with how predictive models interpret and act upon real data. It is a crucial step in developing reliable synthetic datasets for environments where real data is scarce, sensitive, or subject to privacy concerns, allowing for broader and more ethical application of data-driven technologies.

For example, the system may determine a first value for one or more features in the first outputs corresponding to the model constraint and determine the first characteristic requirement based on the first value. The system may validate the first synthetic data by determining a second value for one or more features in the second outputs and comparing the second value to the first characteristic requirement. For example, the system starts by running real-world (e.g., actual) data through a predictive model. This model could be designed for a wide range of tasks, such as classification, regression, or any other predictive task relevant to the system's application. From the outputs generated by processing the real data, the system identifies a first value (or set of values) for one or more specific features. This first value serves as a benchmark and could represent various statistical measures such as mean, median, mode, or even more complex metrics depending on the system's goals and the nature of the data. For example, the system may select a model constraint corresponding to a specific outlier event. Based on the first value(s) derived from the real data outputs, the system establishes the first characteristic requirement. This requirement articulates the expected performance, behavior, or statistical property that the synthetic data should mimic or achieve when processed by the predictive model. The system generates synthetic data that is intended to reflect the characteristics of the real-world data closely. This synthetic data is then processed through the same predictive model to produce a set of second outputs. From these outputs, the system determines a second value for the same features it analyzed in the real data outputs. This second value is analogous to the first value but derived from the model's interaction with synthetic data. The system validates the synthetic data by comparing the second value against the first characteristic requirement. This involves assessing whether the second value falls within acceptable bounds or matches the first value closely enough to meet predefined criteria. If the second value aligns with the first characteristic requirement, it suggests that the synthetic data is a viable proxy for the real data in terms of how it is interpreted and handled by the predictive model. If there is a significant discrepancy, it indicates that the synthetic data may not adequately capture the essential characteristics of the real data, necessitating further refinement. Based on the outcome of the validation comparison, the system may need to adjust the data generation process, the model, or the characteristic requirements themselves. The process of generating synthetic data, analyzing it, and comparing it to the characteristic requirement is iterative. With each cycle, adjustments are made to improve the alignment between the second value and the first characteristic requirement until the synthetic data is validated. Through this methodical approach, the system ensures that the synthetic data not only statistically resembles real data but also behaves in a similar manner when subjected to predictive analysis, making it suitable for a wide range of applications where real data might be limited or sensitive.

For example, the system may determine a first frequency (and/or average value, percentage of values, etc.) for one or more features in the first outputs corresponding to the model constraint and determine the first characteristic requirement based on the first frequency. The system may validate the first synthetic data by determining a second frequency (and/or average value, percentage of values, etc.) for one or more features in the second outputs and comparing the second frequency to the first characteristic requirement. For example, the system may process real (actual) data through a predictive model, generating a set of first outputs. It then analyzes these outputs to determine statistical measures such as the frequency of occurrence for specific features, average values, or percentages of values. This step is crucial for establishing a baseline or benchmark that reflects the statistical behavior of real-world data as interpreted by the model. Based on this analysis, the system establishes the first characteristic requirement, which outlines the expected statistical measures (e.g., frequencies, averages, percentages) for the synthetic data to be considered valid. This requirement acts as a target for the synthetic data to match or closely approximate. The system generates synthetic data designed to simulate the characteristics of the real data closely. This involves using methods like generative models, which are trained to produce data that statistically resembles the training data. The synthetic data is then processed through the same predictive model, resulting in a set of second outputs. These outputs are analyzed to determine the same statistical measures (e.g., frequency, average value, percentage of values) for one or more features, just as was done with the real data. From the second outputs, the system calculates the second frequency (and/or average values, percentages of values) for the same features analyzed in the real data. This calculation is aimed at evaluating how closely the synthetic data replicates the statistical behavior of the real data when processed by the predictive model. The system compares these measures from the synthetic data (second frequency, averages, percentages) against the first characteristic requirement established from the real data. This comparison determines whether the synthetic data adequately mirrors the statistical properties of the real data. If the measures from the synthetic data align with the first characteristic requirement, the synthetic data is validated.

This indicates that the synthetic data can statistically represent real data, making it suitable for further use in model training, simulations, or analysis. If there is a discrepancy, indicating that the synthetic data fails to meet the established requirement, it suggests the need for adjustments in the synthetic data generation process. The validation process may reveal discrepancies that require adjustments to the synthetic data generation approach. The system iteratively refines the generation process, using feedback from the comparison step to produce synthetic data that increasingly aligns with the real data's statistical measures. This iterative refinement and validation continue until the synthetic data meets the first characteristic requirement, ensuring its statistical fidelity to real data.

At step 510, process 500 (e.g., using one or more components described above) trains a second predictive model based on the synthetic data. For example, the system may train a second predictive model based on the first synthetic data. For example, the system may use the synthetic dataset to train a new model to make recommendations or retrain an existing model.

In some embodiments, training the second predictive model based on the first synthetic data comprises the system retrieving the first synthetic data and retraining the first predictive model using the first synthetic data. Alternatively or additionally, the system may determine an algorithm used to train the first predictive model and process the first synthetic data using the algorithm. For example, utilizing synthetic datasets to train new models or retrain existing ones for recommendation purposes is a nuanced process that begins with the generation of synthetic data tailored to model requirements. This involves analyzing necessary data types-such as user profiles, item details, and user-item interactions-to create a synthetic dataset that closely mimics real-world scenarios using techniques like Generative Adversarial Networks (GANs) or Variational Autoencoders (VAEs). The goal is to capture the complexity and diversity of user behaviors and item characteristics without compromising privacy or introducing bias. Once generated, this synthetic data undergoes preprocessing and feature engineering to ensure it's in the appropriate format for model training, with relevant features extracted to aid the recommendation process. Training a new model with this data involves typical machine learning practices, such as dividing the dataset into training, validation, and test sets, whereas retraining an existing model incorporates the synthetic data to refine and enhance its predictive capabilities, potentially addressing issues like overfitting by providing a broader range of learning examples. The evaluation of the model's performance is crucial, employing metrics specific to recommendation systems and possibly synthetic benchmarks to gauge the model's ability to generate meaningful recommendations. Based on these evaluations, the model may undergo fine-tuning to adjust to the synthetic data's idiosyncrasies, optimizing its parameters for improved accuracy and relevance of recommendations. If feasible, integrating the synthetically trained model with real data in a controlled setting can offer insights into its real-world applicability and generalization capabilities. Continuous monitoring post-deployment ensures the model remains effective and adjusts to new data or user behavior patterns. Throughout this process, maintaining ethical standards and privacy compliance is paramount, particularly in monitoring and mitigating bias that synthetic data may introduce, ensuring the model's fairness and representativeness.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for monitoring compliance of artificial intelligence models using an observer model and/or for mitigating hindsight bias related to training and using artificial intelligence models for outlier events by applying model constraints to synthetic data generator models.

2. The method of the preceding embodiment, further comprising: receiving a compliance requirement for a first model, wherein the first model comprises a plurality of unknown characteristics, and wherein the plurality of unknown characteristics is used to process inputs to the first model to generate outputs; generating a second model corresponding to the first model, wherein the second model comprises a probabilistic graphical model corresponding to the first model, and wherein the probabilistic graphical model is trained to determine probabilities for graphical characteristics corresponding to the plurality of unknown characteristics; determining a first graphical characteristic of the graphical characteristics corresponding to the compliance requirement; determining a first probability of the probabilities corresponding to the first graphical characteristic; comparing the first probability to a threshold probability to determine whether the first model corresponds to the compliance requirement; and generating for display, on a user interface, a recommendation based on comparing the first probability to the threshold probability.

3. The method of any one of the preceding embodiments, wherein determining the first graphical characteristic of the graphical characteristics corresponding to the compliance requirement further comprises: inputting the first compliance requirement into a database listing graphical characteristics that correspond to compliance requirements; and receiving an output from the database indicating that the compliance requirement corresponds to the first graphical characteristic.

4. The method of any one of the preceding embodiments, wherein the probabilistic graphical model is trained to determine probabilities for graphical characteristics corresponding to the plurality of unknown characteristics by: receiving training data, wherein the training data is based on inputs to the first model, outputs from the first model, and known characteristics of the first model; and training the second model based on the training data.

5. The method of any one of the preceding embodiments, wherein the probabilistic graphical model is trained to determine probabilities for graphical characteristics corresponding to the plurality of unknown characteristics by: receiving training data, wherein the training data comprises Shapley values for features in the first model; aggregating the Shapley values to generate an aggregated set; and training the second model based on the aggregated set.

6. The method of any one of the preceding embodiments, wherein the probabilistic graphical model is trained to determine probabilities for graphical characteristics corresponding to the plurality of unknown characteristics by: receiving training data, wherein the training data comprises results of a recursive feature elimination performed on the first model; and training the second model based on the results.

7. The method of any one of the preceding embodiments, wherein the probabilistic graphical model is trained to determine probabilities for graphical characteristics corresponding to the plurality of unknown characteristics by: receiving training data, wherein the training data comprises results of least absolute shrinkage and selection operators on the first model; and training the second model based on the results.

8. The method of any one of the preceding embodiments, wherein the probabilistic graphical model is trained to determine probabilities for graphical characteristics corresponding to the plurality of unknown characteristics by: receiving training data, wherein the training data comprises permutation importance values for features in the first model; aggregating the permutation importance values to generate an aggregated set; and training the second model based on the aggregated set.

9. The method of any one of the preceding embodiments, wherein the probabilistic graphical model is trained to determine probabilities for graphical characteristics corresponding to the plurality of unknown characteristics by: receiving training data, wherein the training data comprises principal component analysis values for features in the first model; aggregating the principal component analysis values to generate an aggregated set; and training the second model based on the aggregated set.

10. The method of any one of the preceding embodiments, wherein comparing the first probability to the threshold probability to determine whether the first model corresponds to the compliance requirement further comprises: determining a second graphical characteristic of the graphical characteristics corresponding to the compliance requirement; determining a second probability of the probabilities corresponding to the first graphical characteristic; aggregating the first probability and the second probability to generate an aggregated probability; and comparing the aggregated probability to the threshold probability.

11. The method of any one of the preceding embodiments, wherein generating the second model corresponding to the first model further comprises: generating a snapshot of the first model; and training the second model based on the snapshot of the first model.

12. The method of any one of the preceding embodiments, wherein generating the second model corresponding to the first model further comprises: receiving a known characteristic of the first model; and training the second model based on the known characteristic of the first model.

13. The method of any one of the preceding embodiments, wherein generating the second model corresponding to the first model further comprises: receiving a training history of the first model; and training the second model based on the training history of the first model.

14. The method of any one of the preceding embodiments, wherein generating the second model corresponding to the first model further comprises: receiving a first version of the first model; receiving a second version of the first model; determining a difference between the first model and the second model; and training the second model based on the difference.

15. The method of any one of the preceding embodiments, wherein generating the second model corresponding to the first model further comprises: receiving a previous version of the second model; receiving a current version of the first model; and training the second model based on the previous version of the second model and the current version of the first model.

16. The method of any one of the preceding embodiments, the method comprising: receiving a first dataset, wherein the first dataset comprises actual historical data over a first time period; receiving a first predictive model that generates first outputs, wherein the first predictive model is trained on the first dataset, wherein the first outputs have a first plurality of characteristics; receiving a first characteristic requirement for the first outputs, wherein the first characteristic requirement comprises a required threshold for a first characteristic in the first plurality of characteristics; generating first synthetic data using a synthetic data generator model, wherein the first synthetic data comprises synthetic historical data over the first time period, wherein the synthetic data generator model is trained to generate the first synthetic data, and wherein training the synthetic data generator model comprises applying a model constraint to the synthetic data generator model during training, wherein the model constraint is based on the first characteristic requirement being met in second outputs of the first predictive model when the first synthetic data is processed by the first predictive model; and training a second predictive model based on the first synthetic data.

17. The method of any one of the preceding embodiments, wherein generating first synthetic data further comprises validating the first synthetic data by: inputting the first synthetic data into the first predictive model to generate the second outputs, wherein the second outputs have a second plurality of characteristics; and determining to validate the first synthetic data by determining that the first characteristic in the second plurality of characteristics meets the first characteristic requirement.

18. The method of any one of the preceding embodiments, further comprising: receiving a first feature input for the second predictive model; processing the first feature input using the second predictive model to generate a first output; and generating for display, on a user interface, a first recommendation based on the first output.

19. The method of any one of the preceding embodiments, further comprising: receiving the model constraint in response to a user input; determining a first certainty for one or more features in the first outputs based on the model constraint; and determining the first characteristic requirement based on the first certainty.

20. The method of any one of the preceding embodiments, further comprising validating the first synthetic data by: determining a second certainty for one or more features in the second outputs; and comparing the second certainty to the first characteristic requirement.

21. The method of any one of the preceding embodiments, further comprising: determining a first range of values for one or more features in the first outputs based on the model constraint; and determining the first characteristic requirement based on the first range of values.

22. The method of any one of the preceding embodiments, further comprising validating the first synthetic data by: determining a second range of values for one or more features in the second outputs; and comparing the second range of values to the first characteristic requirement.

23. The method of any one of the preceding embodiments, further comprising: determining a first value for one or more features in the first outputs corresponding to the model constraint; and determining the first characteristic requirement based on the first value.

24. The method of any one of the preceding embodiments, further comprising validating the first synthetic data by: determining a second value for one or more features in the second outputs; and comparing the second value to the first characteristic requirement.

25. The method of any one of the preceding embodiments, further comprising: determining a first frequency for one or more features in the first outputs corresponding to the model constraint; and determining the first characteristic requirement based on the first frequency.

26. The method of any one of the preceding embodiments, further comprising validating the first synthetic data by: determining a second frequency for one or more features in the second outputs; and comparing the second frequency to the first characteristic requirement.

27. The method of any one of the preceding embodiments, further comprising: determining a first average value for one or more features in the first outputs corresponding to the model constraint; and determining the first characteristic requirement based on the first average value.

28. The method of any one of the preceding embodiments, further comprising: receiving the model constraint in response to a user input; determining a first percentage of values for one or more features in the first outputs corresponding to the model constraint; and determining the first characteristic requirement based on the first percentage of values.

29. The method of any one of the preceding embodiments, wherein training the second predictive model based on the first synthetic data further comprises: retrieving the first synthetic data; and retraining the first predictive model using the first synthetic data.

30. The method of any one of the preceding embodiments, wherein training the second predictive model based on the first synthetic data further comprises: determining an algorithm used to train the first predictive model; and processing the first synthetic data using the algorithm.

31. A tangible, non-transitory, computer-readable medium storing instructions that, when executed by a data processing apparatus, cause the data processing apparatus to perform operations comprising those of any of embodiments 1-30.

32. A system comprising one or more processors; and memory storing instructions that, when executed by the processors, cause the processors to effectuate operations comprising those of any of embodiments 1-0.

33. A system comprising means for performing any of embodiments 1-30.

What is claimed is:

1. A computer-implemented method for generating recommendations using probabilistic graphical models trained to detect outlier events, the computer-implemented method comprising:

receiving a first dataset, wherein the first dataset comprises actual historical data over a first time period;

receiving a first predictive model, wherein the first predictive model is used to process inputs to generate first outputs, wherein the first predictive model comprises a plurality of trainable parameters comprising one or more of a node, an edge, or a weight, wherein the first predictive model is trained on the first dataset, and wherein the first outputs have a first plurality of characteristics;

receiving a first characteristic requirement for the first outputs, wherein the first characteristic requirement comprises a required threshold value for a first characteristic in the first plurality of characteristics, wherein the first characteristic requirement specifies a target frequency, target probability, target confidence value, target value, target range, or target percentage associated with at least one characteristic of outputs generated by the first predictive model;

generating first synthetic data using a first synthetic data generator model, wherein the first synthetic data comprises synthetic historical data over the first time period, wherein the first synthetic data generator model is trained to generate the first synthetic data, and wherein training the first synthetic data generator model comprises:

processing the first synthetic data through the first predictive model to generate second outputs;

determining whether the second outputs satisfy the first characteristic requirement;

iteratively modifying one or more parameters of the first synthetic data generator model based on whether the second outputs satisfy the first characteristic requirement, wherein the first synthetic data generator model is trained to optimize the first synthetic data such that the second outputs satisfy the first characteristic requirement;

re-training, based on the first synthetic data, the first predictive model to generate a second predictive model; and generating for display, on a user interface, a first recommendation using the second predictive model.

2. The computer-implemented method of claim 1, wherein generating the first synthetic data further comprises: validating the first synthetic data by:

inputting the first synthetic data into the first predictive model to generate the second outputs, wherein the second outputs have a second plurality of characteristics; and determining to validate the first synthetic data by determining that the first characteristic in the second plurality of characteristics meets the first characteristic requirement.

3. The computer-implemented method of claim 1, further comprising:

receiving a first input for the second predictive model;

processing the first input using the second predictive model to generate a first output; and generating for display, on the user interface, the first recommendation based on the first output.

4. The computer-implemented method of claim 1, further comprising:

determining to re-train the first predictive model based on:

determining a first average value in the first plurality of characteristics of the first outputs; and comparing the first characteristic requirement to the first average value.

5. The computer-implemented method of claim 1, further comprising:
- determining to re-train the first predictive model based on:
  - determining a first percentage of values in the first plurality of characteristics of the first outputs corresponding; and
  - comparing the first characteristic requirement to the first percentage of values.

6. The computer-implemented method of claim 1, wherein re-training the first predictive model to generate the second predictive model further comprises:
- determining an algorithm used to train the first predictive model; and
- processing the first synthetic data using the algorithm.

7. The computer-implemented method of claim 1, further comprising:
- receiving a user input; and
- determining the first characteristic requirement based on the user input.

8. The computer-implemented method of claim 7, further comprising validating the first synthetic data by:
- determining a second characteristic of the second outputs; and
- comparing the second characteristic to the first characteristic requirement.

9. The computer-implemented method of claim 1, further comprising:
- determining to re-train the first predictive model based on:
  - determining a first range of values in the first plurality of characteristics of the first outputs; and
  - comparing the first characteristic requirement to the first range of values.

10. The computer-implemented method of claim 9, further comprising validating the first synthetic data by:
- determining a second range of values for a second plurality of characteristics of the second outputs; and
- comparing the second range of values to the first characteristic requirement.

11. The computer-implemented method of claim 1, further comprising:
- determining a first value in the first plurality of characteristics of the first outputs; and
- comparing the first characteristic requirement to the first value.

12. The computer-implemented method of claim 11, further comprising validating the first synthetic data by:
- determining a second value for a second plurality of characteristics of the second outputs; and
- comparing the second value to the first characteristic requirement.

13. The computer-implemented method of claim 1, further comprising:
- determining to re-train the first predictive model based on:
  - determining a first frequency in the first plurality of characteristics of the first outputs; and
  - comparing the first characteristic requirement to the first frequency.

14. The computer-implemented method of claim 13, further comprising validating the first synthetic data by:
- determining a second frequency for a second plurality of characteristics of the second outputs; and
- comparing the second frequency to the first characteristic requirement.

15. One or more non-transitory, computer-readable mediums having instructions recorded thereon that when executed by one or more processors causes operations comprising:
- receiving a first dataset, wherein the first dataset comprises actual historical data over a first time period;
- receiving a first predictive model, wherein the first predictive model is used to process inputs to generate first outputs, wherein the first predictive model comprises a plurality of trainable parameters comprising one or more of a node, an edge, or a weight, wherein the first predictive model is trained on the first dataset, and wherein the first outputs have a first plurality of characteristics;
- receiving a first characteristic requirement for the first outputs, wherein the first characteristic requirement comprises a required threshold value for a first characteristic in the first plurality of characteristics, wherein the first characteristic requirement specifies a target frequency, target probability, target confidence value, target value, target range, or target percentage associated with at least one characteristic of outputs generated by the first predictive model;
- generating first synthetic data using a first synthetic data generator model, wherein the first synthetic data comprises synthetic historical data over the first time period, wherein the first synthetic data generator model is trained to generate the first synthetic data, and wherein training the first synthetic data generator model comprises:
  - processing the first synthetic data through the first predictive model to generate second outputs;
  - determining whether the second outputs satisfy the first characteristic requirement;
  - iteratively modifying one or more parameters of the first synthetic data generator model based on whether the second outputs satisfy the first characteristic requirement, wherein the first synthetic data generator model is trained to optimize the first synthetic data such that the second outputs satisfy the first characteristic requirement;
- re-training, based on the first synthetic data, the first predictive model to generate a second predictive model; and
- generating for display, on a user interface, a first recommendation using the second predictive model.

16. The one or more non-transitory, computer-readable mediums of claim 15, wherein the instructions further cause operations comprising:
- receiving a first input for the second predictive model;
- processing the first input using the second predictive model to generate a first output; and
- generating for display, on the user interface, the first recommendation based on the first output.

17. The one or more non-transitory, computer-readable mediums of claim 15, wherein the instructions further cause operations comprising:
- receiving a user input; and
- determining the first characteristic requirement based on the user input.

18. The one or more non-transitory, computer-readable mediums of claim 15, wherein the instructions further cause operations comprising: determining to re-train the first predictive model based on: determining a first frequency in the first plurality of characteristics of the first outputs; and
- comparing the first characteristic requirement to the first frequency.

19. The one or more non-transitory, computer-readable mediums of claim 15, wherein the instructions further cause operations comprising:

determining a first value in the first plurality of characteristics of the first outputs; and comparing the first characteristic requirement to the first value.

20. The one or more non-transitory, computer-readable mediums of claim 19, wherein the instructions further cause operations comprising:

validating the first synthetic data by: determining a second value for a second plurality of characteristics of the second outputs; and comparing the second value to the first characteristic requirement.

* * * * *